(12) United States Patent
Hamann et al.

(10) Patent No.: US 10,678,310 B2
(45) Date of Patent: Jun. 9, 2020

(54) MODULAR TABLET CASE WITH ENVIRONMENTAL MONITORING COMPONENTS

(71) Applicant: MOBELISK GROUP, LLC, Phoenix, AZ (US)

(72) Inventors: Dennis Hamann, Phoenix, AZ (US); Chris Robson, Phoenix, AZ (US); Eric Bodnar, Santa Cruz, CA (US)

(73) Assignee: Mobelisk Group, LLC, Phoenix, AZ (US)

( * ) Notice: Subject to any disclaimer, the term of this patent is extended or adjusted under 35 U.S.C. 154(b) by 0 days.

(21) Appl. No.: 16/463,006

(22) PCT Filed: Nov. 22, 2017

(86) PCT No.: PCT/US2017/063146
§ 371 (c)(1),
(2) Date: May 22, 2019

(87) PCT Pub. No.: WO2018/098373
PCT Pub. Date: May 31, 2018

(65) Prior Publication Data
US 2019/0317564 A1    Oct. 17, 2019

Related U.S. Application Data

(60) Provisional application No. 62/425,854, filed on Nov. 23, 2016.

(51) Int. Cl.
*G06F 1/16* (2006.01)
*H05K 5/00* (2006.01)
(Continued)

(52) U.S. Cl.
CPC ............... *G06F 1/18* (2013.01); *H02J 7/342* (2020.01); *H02J 7/00* (2013.01); *H02J 7/025* (2013.01)

(58) Field of Classification Search
CPC ... G06F 1/1632; G06F 1/1626; F16M 11/041; F16M 11/105; F16M 11/2021; F16M 11/38; H02J 7/342; H02J 7/025
See application file for complete search history.

(56) References Cited

U.S. PATENT DOCUMENTS 7,612,997 B1 * 11/2009 Diebel .................. G06F 1/1632
361/679.41
7,782,610 B2 * 8/2010 Diebel .................. G06F 1/1628
361/679.41

(Continued)

OTHER PUBLICATIONS

Written Opinion of the International Searching Authority dated Apr. 12, 2018 issued in International Patent Application No. PCT/US2017/063146.

(Continued)

*Primary Examiner* — Anthony M Haughton
(74) *Attorney, Agent, or Firm* — Pillsbury Winthrop Shaw Pittman, LLP

(57) ABSTRACT

A tablet computer with modular assembly or smartcase having interchangeable accessory cap portions, and a method for using the same to monitor environmental conditions around the tablet computer and smartcase. The smartcase provides a universal design and customized features to a range of tablets. The smartcase has a tablet carrier connected to selected type of tablet computer and an exterior housing connected to the tablet carrier. The exterior housing/cap contains at least one battery, a memory, sensor(s) and a controller for communication with the selected tablet computer. The housing also includes accessory cap portions configured to communicate with the controller and implement a function. The data collected by the sensor(s) is utilized to monitor conditions associated with the smartcase such that preemptive or corrective action regarding the smartcase and/or tablet computer may be implemented. The (Continued)

smartcase can also include one or more programmable LED buttons and/or indicators.

25 Claims, 20 Drawing Sheets

(51) Int. Cl.
| | | |
|---|---|---|
| *H05K 7/00* | | (2006.01) |
| *G06F 1/18* | | (2006.01) |
| *H02J 7/34* | | (2006.01) |
| *H02J 7/02* | | (2016.01) |
| *H02J 7/00* | | (2006.01) |

(56) References Cited

U.S. PATENT DOCUMENTS

| | | | |
|---|---|---|---|
| 8,077,453 B2 | 12/2011 | Swan et al. | |
| 8,279,589 B2 | 10/2012 | Kim | |
| 8,367,235 B2* | 2/2013 | Huang | G06F 1/1632 |
| | | | 429/96 |
| 8,380,259 B2 | 2/2013 | Jain et al. | |
| 8,390,445 B2 | 3/2013 | Betts et al. | |
| 8,523,068 B2 | 9/2013 | Hsu et al. | |
| 8,733,648 B2 | 5/2014 | Melbrod et al. | |
| 8,929,961 B2 | 1/2015 | Norair et al. | |
| 8,954,117 B2 | 2/2015 | Huang | |
| 8,971,039 B2* | 3/2015 | Huang | G06F 1/1626 |
| | | | 361/679.56 |
| 8,983,444 B2 | 3/2015 | Yun | |
| 8,983,560 B2 | 3/2015 | Katis et al. | |
| 9,007,758 B2 | 4/2015 | Wilson et al. | |
| 9,048,665 B2 | 6/2015 | Wojcik et al. | |
| 9,160,824 B2 | 10/2015 | Torset et al. | |
| 9,172,070 B2 | 10/2015 | Huang et al. | |
| 9,241,054 B1 | 1/2016 | Roberts | |
| 9,270,319 B2 | 2/2016 | Bietz et al. | |
| 9,274,556 B2* | 3/2016 | Gallouzi | F16M 11/041 |
| 9,350,838 B2 | 5/2016 | Drori et al. | |
| 9,401,983 B2 | 7/2016 | Lechner et al. | |
| 9,652,002 B2 | 5/2017 | Hamann et al. | |
| 9,997,751 B2* | 6/2018 | Fathollahi | H01M 2/1061 |
| 10,050,658 B2* | 8/2018 | Carnevali | G06F 1/1632 |
| 10,401,905 B2* | 9/2019 | Carnevali | G06F 1/1632 |
| 2007/0152633 A1* | 7/2007 | Lee | G06F 1/1632 |
| | | | 320/114 |
| 2007/0236180 A1* | 10/2007 | Rodgers | H02J 7/342 |
| | | | 320/115 |
| 2008/0096620 A1* | 4/2008 | Lee | G06F 1/1626 |
| | | | 455/575.8 |
| 2008/0123287 A1* | 5/2008 | Rossell | G06F 1/1632 |
| | | | 361/679.3 |
| 2008/0132289 A1* | 6/2008 | Wood | H04B 1/3888 |
| | | | 455/566 |
| 2008/0259551 A1 | 10/2008 | Gavenda et al. | |
| 2010/0078343 A1 | 4/2010 | Hoellwarth et al. | |
| 2010/0124040 A1 | 5/2010 | Diebel et al. | |
| 2012/0244848 A1 | 9/2012 | Ghaffari et al. | |
| 2012/0262618 A1 | 10/2012 | Weakly | |
| 2013/0278552 A1 | 10/2013 | Kamin-Lyndgaard | |
| 2013/0341399 A1 | 12/2013 | Xian et al. | |
| 2014/0200054 A1 | 7/2014 | Fraden | |
| 2014/0347000 A1 | 11/2014 | Hamann et al. | |
| 2015/0011268 A1 | 1/2015 | Charugundla | |
| 2015/0263777 A1 | 9/2015 | Fraden | |
| 2015/0373180 A1 | 12/2015 | Kari et al. | |
| 2016/0028430 A1 | 1/2016 | Crawford et al. | |
| 2016/0042726 A1 | 2/2016 | Glaser et al. | |
| 2016/0084707 A1 | 3/2016 | Scott et al. | |
| 2016/0105207 A1 | 4/2016 | Rosen et al. | |
| 2016/0142093 A1 | 5/2016 | Phang | |
| 2016/0173159 A1 | 6/2016 | Chu et al. | |

OTHER PUBLICATIONS

International Search Report dated Apr. 12, 2018 issued in International Patent Application No. PCT/US2017/063146.

International Preliminary Report on Patentability dated Jun. 6, 2019 issued in corresponding International Patent Application No. PCT/US2017/063146.

\* cited by examiner

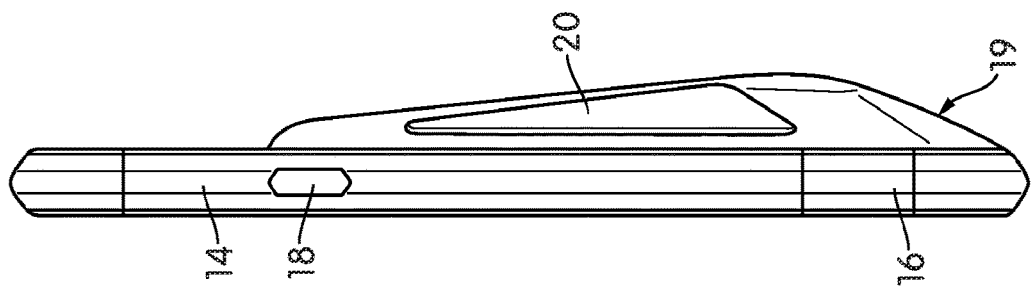
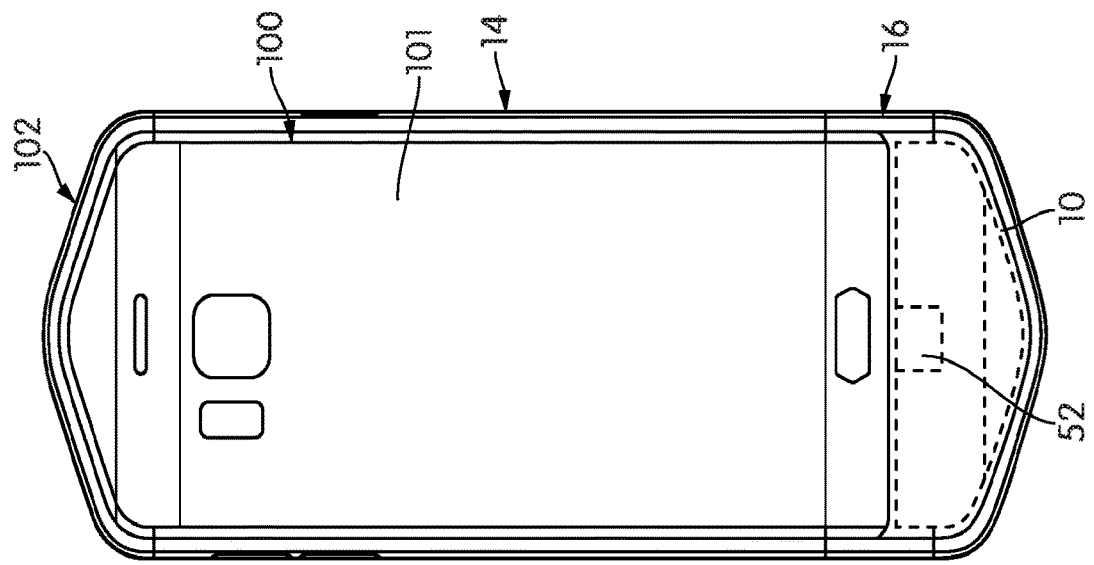
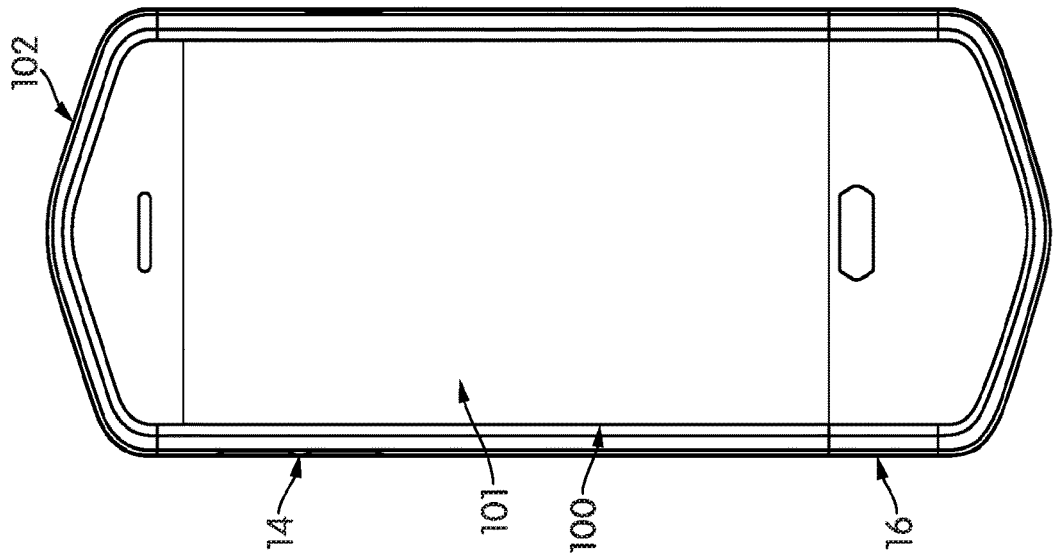

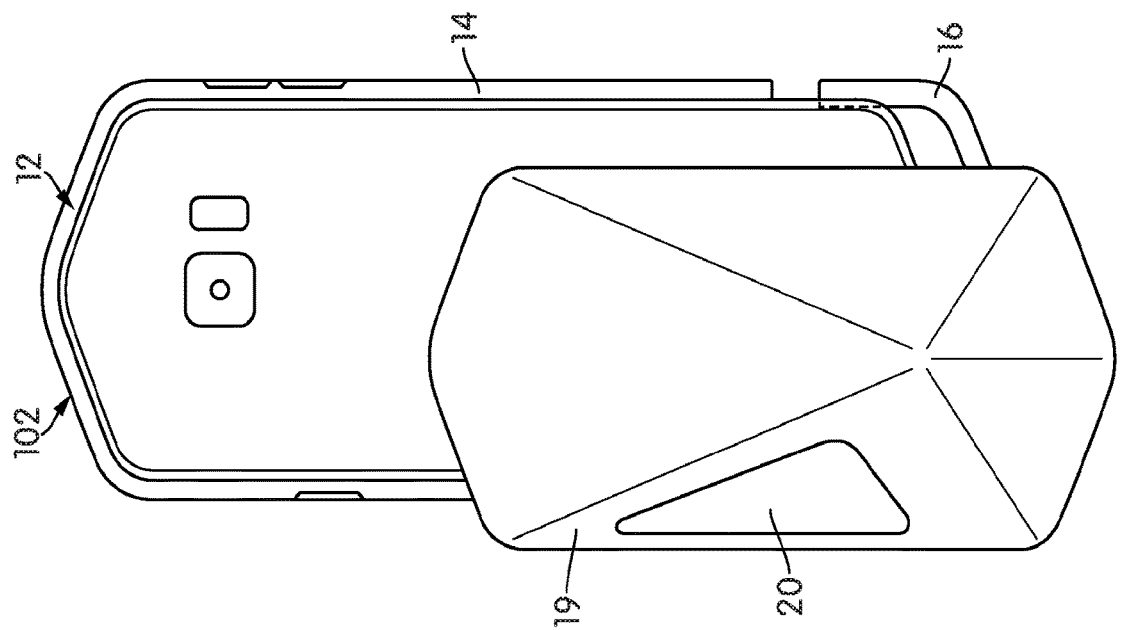
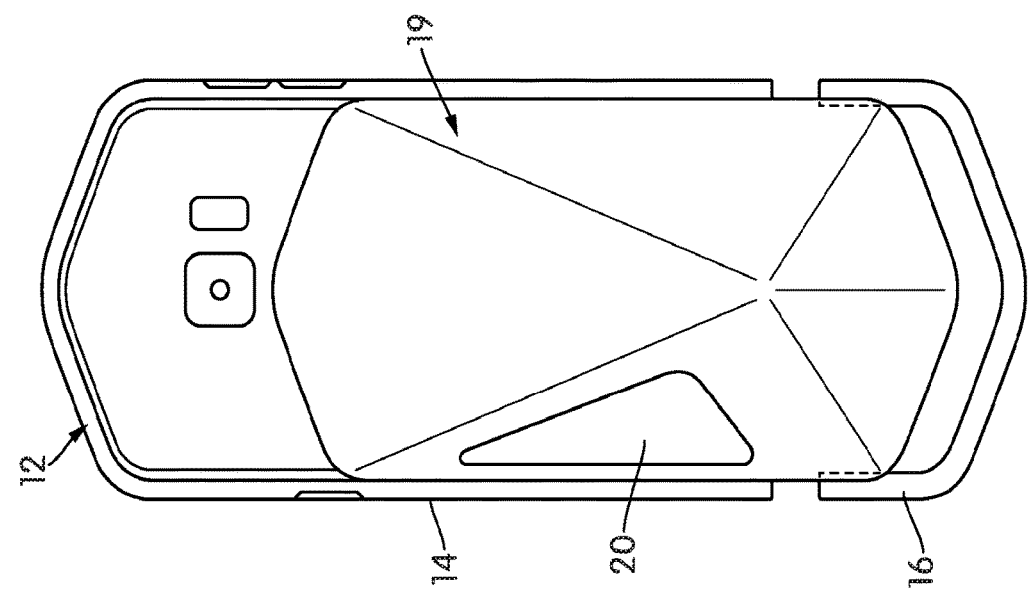
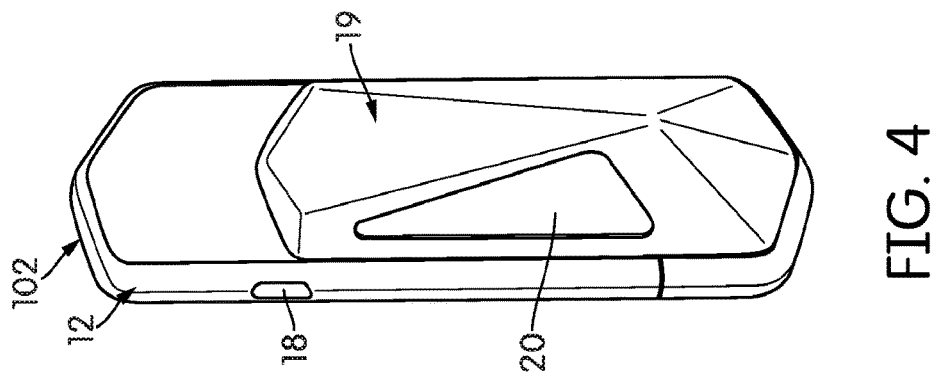

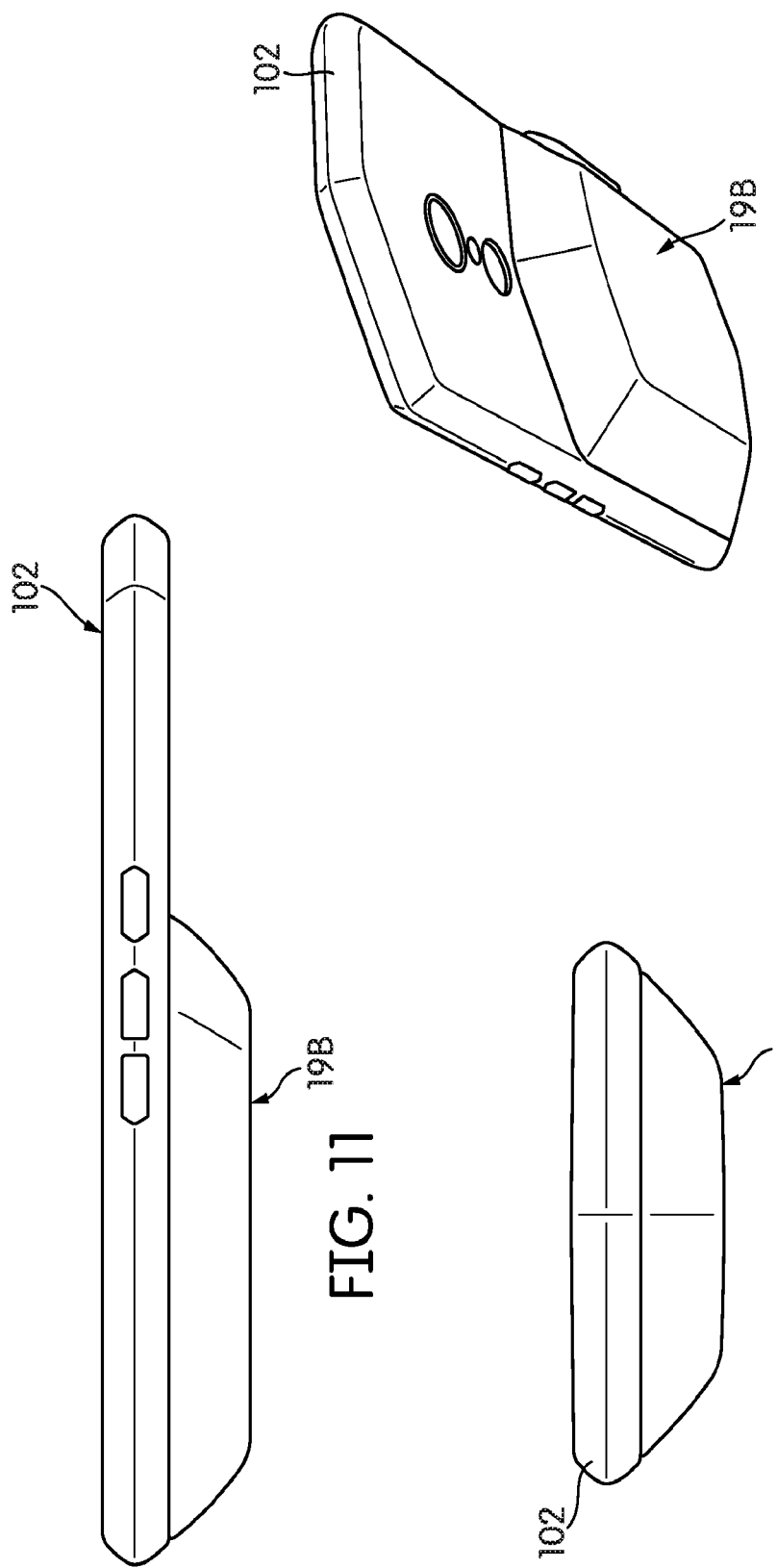

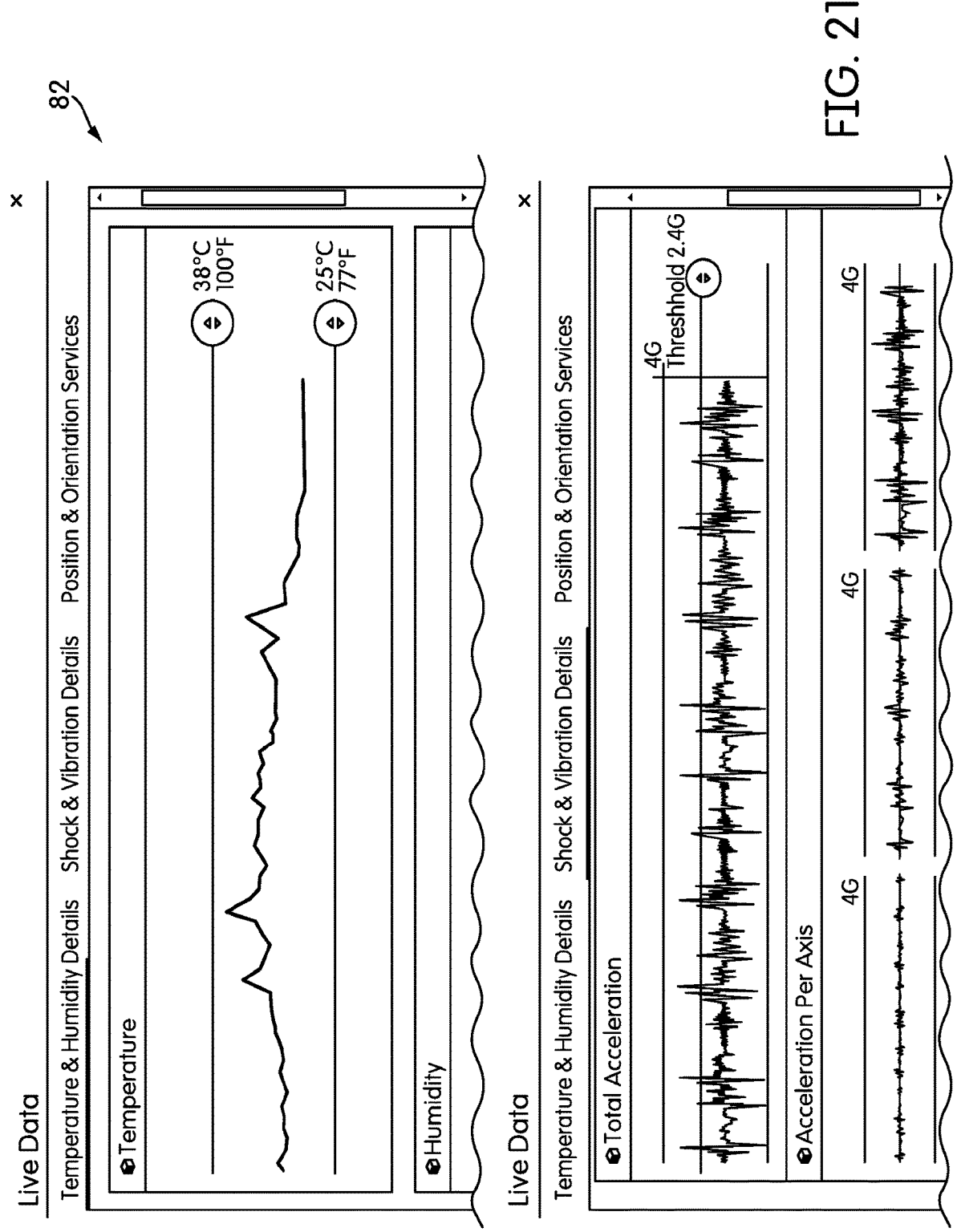

86

| Operational Limits | | Show Units: kms⊙miles | Show Units: C⊙F |

Maximum Operation Time: [08:00] hh:mm  Operating Temperatures °C: Max.[40] Min.[5]
Maximum Permitted Travel: [500] kms  Operating Humidity %: Max.[90] Min.[10]
Shock Limits: [10] Shock
Max Acceleration Limit: [4] G  (Submit)

FIG. 22

Battery Status

Case Battery
85%
Charging

91

Phone Battery
70%
Discharging

FIG. 23

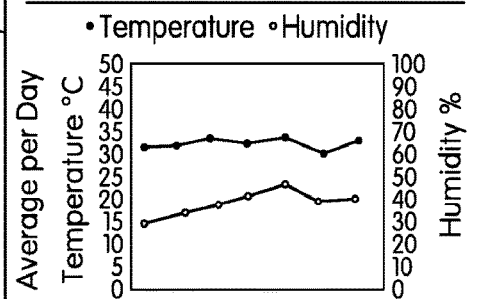

Working Environment
• Temperature  ∘ Humidity

92

30.5 C   Average Temperature During the Last 7 Days
-4.1 C   Change in Average Temperature from Prior 7 Day Period
△15.4 C  Minimum Temperature During the Last 7 Days
△46.9 C  Maximum Temperature During the Last 7 Days
72.0%    Average Humidity During the Last 7 Days
+71.8%   Change in Average Humidity from Prior 7 Days
20.5%    Minimum Humidity During the Last 7 Days
81.5%    Maximum Humidity During the Last 7 Days Show All Issues

FIG. 24

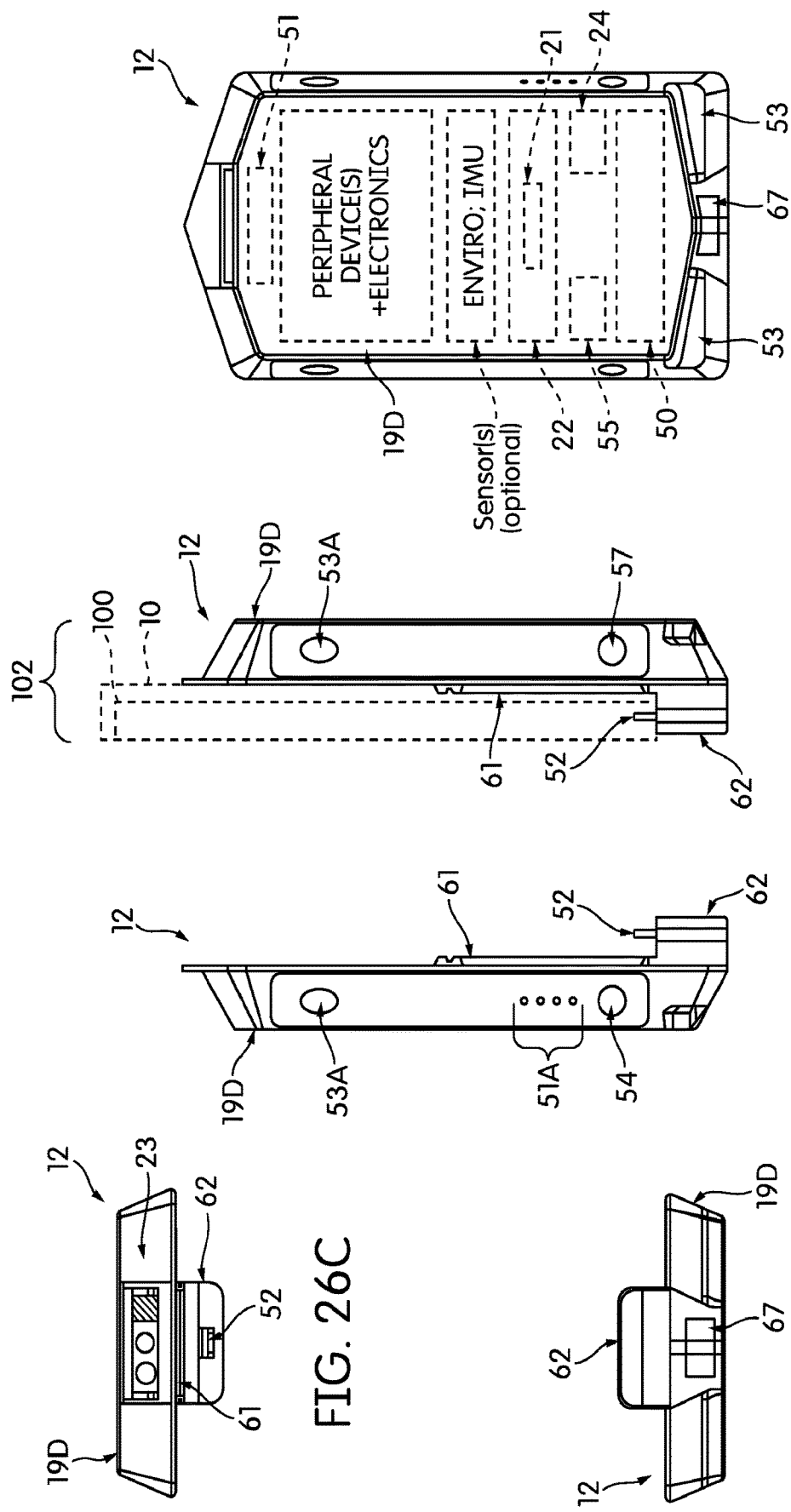

MODULAR TABLET CASE WITH ENVIRONMENTAL MONITORING COMPONENTS

CROSS-REFERENCE TO RELATED APPLICATIONS

This is the U.S. National. Stage of PCT/US2017/063146, filed Nov. 22, 2017, which claims priority to U.S. Provisional Patent Application No. 62/425,854, filed Nov. 23, 2016, the contents of each of which are incorporated herein by reference in their entireties.

BACKGROUND

Field

The present disclosure is generally related to a modular assembly or case for an electronic device, such as a tablet or phablet or mobile phone.

Description of Related Art

For electronic devices with a touch screen, covers typically include an opening providing access to the screen. Some covers also have parts (e.g., holes or press buttons) that correspond and align with a position of the devices (e.g., ports or buttons) on the tablet to allow mechanical access to the tablet devices. Some manufacturers may also limit themselves entirely to plastic enclosures for purely esthetic and rudimentary protective purposes.

Although some covers may include additional battery functionalities therein, many are limited with regards to sensors, storage, and communication capabilities.

Also, known communication devices in electronic device covers typically only relate to reporting the battery state of charge of the device, and in some cases may, for example, distribute local notifications that prompt an end user to take an action, such as charging or replacing the battery.

U.S. Ser. No. 14/280,451, filed on May 16, 2014 and patented on May 16, 2017 under U.S. Pat. No. 9,652,002, and assigned to the applicant of this disclosure, and which is hereby incorporated by reference in its entirety, describes an example of a case having a functional end cap associated therewith.

SUMMARY

It is an aspect of this disclosure to provide a modular case assembly for a selected range of tablet computers. The modular assembly includes: a tablet carrier for encasing a selected tablet computer selected from the range of tablet computers, the selected tablet computer having one or more ports, a tablet battery, a tablet memory, and an external button configuration; an exterior housing configured to be connected to the tablet carrier, the exterior housing having at least one sensor, a housing memory, and a controller for communication with the selected tablet computer, the at least one sensor, and the housing memory. The modular assembly also includes at least one battery. The at least one battery and the controller contained by the exterior housing are configured to be operatively connected to the tablet computer so as to allow communication of power and data between the controller and the tablet computer. The at least one sensor is configured to sense an environmental condition and wherein the sensed data is stored within the housing memory of the exterior housing independent of a state of the selected tablet computer.

A cap that includes at least a functional device therein may be optionally attached to the exterior housing and be in communication with the controller.

Another aspect provides a modular case assembly for a selected range of tablet computers. The modular assembly includes: a tablet carrier for encasing a selected tablet computer selected from the range of tablet computers, the selected tablet computer having one or more ports, a tablet battery, a tablet memory, and an external button configuration; an exterior housing configured to be connected to the tablet carrier; a cap attached to the exterior housing and including a functional device in communication with the controller along with the tablet computer, and at least one battery. The cap further includes at least one sensor, a housing memory, and a controller for communication with the selected tablet computer, the at least one sensor, and the housing memory. The at least one battery and the controller contained by the cap are configured to be operatively connected to the tablet computer so as to allow communication of power and data between the controller and the tablet computer. The at least one sensor is configured to sense an environmental condition and wherein the sensed data is stored within the housing memory of the cap independently of a state of the selected tablet computer.

Yet another aspect provides a method for automatically monitoring and storing environmental conditions of a tablet computer provided within a modular case assembly, such as the assemblies described above. The method includes: automatically monitoring a status of the tablet computer and communication between the tablet computer and the controller; determining that communication between the tablet computer and the controller is unavailable; sensing data using the at least one sensor; and storing sensed data in the housing memory of the exterior housing independent of a state of the selected tablet computer.

Still another aspect provides a modular case assembly for a selected range of tablet computers, the modular assembly including: an exterior housing configured to connect to a selected tablet computer encased in a tablet carrier, the selected tablet computer being selected from the range of tablet computers, the selected tablet computer having one or more ports, a tablet battery, a tablet memory, and an external button configuration, an accessory cap attached to or incorporated with the exterior housing and including a functional device in communication with the tablet computer; a controller for communication with the selected tablet computer and being operatively connected thereto so as to allow communication of power and data between the controller and the tablet computer; at least one sensor; a housing memory; and at least one battery. Either the exterior housing or the accessory cap, or both, contain the at least one battery and/or the controller. The at least one sensor is configured to sense an environmental condition and wherein the sensed data is stored within the housing memory independently of a state of the selected tablet computer.

Other features and advantages of the present disclosure will become apparent from the following detailed description, the accompanying drawings, and the appended claims.

BRIEF DESCRIPTION OF THE DRAWINGS

FIG. 1 is a top or front view of an electronic device with an installed modular assembly, or smartcase (exterior housing and accessory cap), in accordance with an embodiment of this disclosure.

FIG. 2 is a detailed view of parts of the smartcase of FIG. 1, including exemplary placement of the electronic device therein.

FIG. 3 is a side view of the smartcase of FIG. 1.

FIG. 4 is back side plan view of the smartcase of FIG. 1.

FIG. 5 is a back side view of the smartcase showing parts thereof and an accessory cap in accordance with an embodiment of this disclosure.

FIG. 6A is a back side view of the accessory cap of FIG. 5 unmounted from the smartcase.

FIGS. 11, 12, 13A and 13B show a right side, top, back perspective, and plan views, respectively, of an electronic device and smartcase with an alternate installed accessory cap in accordance with yet another embodiment of this disclosure.

FIGS. 20A, 20B, and 21-24 illustrate exemplary details associated with the dashboards of FIGS. 18 and 19 that may be visually displayed with regards to features and/or settings relating to the data gathered via the smart case, in accordance with an embodiment.

FIGS. 26A, 26B, 26C, 26D, 26E, 26F, and 26G show overhead angled, front, top, bottom, left side, right side, and back views, respectively, of an accessory cap in accordance with yet another embodiment of this disclosure.

DETAILED DESCRIPTION OF THE PREFERRED EMBODIMENT(S)

Figure 2A:
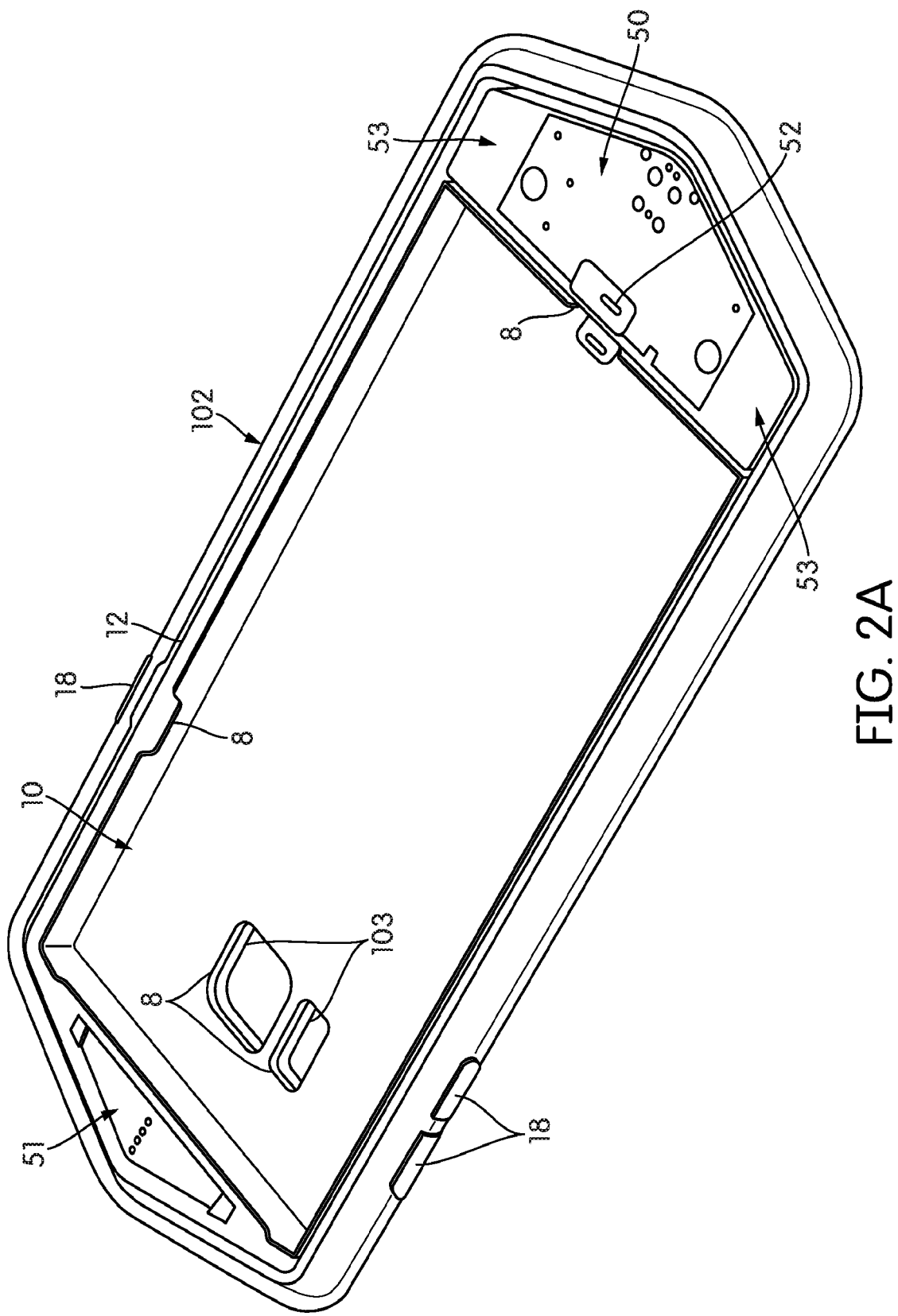
FIGS. 2A and 2B are detailed angled overhead and exploded views, respectively, of parts of the smartcase of FIG. 1, showing internal components therein.

Disclosed herein is a modular assembly that may be used as a universal case for different types of tablet and/or phablet computers and that brings modular functionality to those different tablets. As further described in detail below, the case includes an exterior housing that may optionally include and/or cooperate with interchangeable accessory caps that provide a function for implementation on or with the tablet/phablet computer. Each modular assembly/case can also include at least one programmable button that uses electromechanical actuation to actuate a button or function associated with the tablet computer and/or the case itself. Each modular assembly can also or alternatively include at least one programmable button that uses capacitive or resistive touch detection technology to detect button press events. This disclosure also provides a method for installing modular assemblies around tablet computers, despite the tablet computer design and configuration. Moreover, a number of sensors (e.g., temperature, humidity, accelerometers, vibration, shock, and barometric pressure), added battery life, indicator buttons, and local storage are provided in the case/assembly to facilitate environmental monitoring, reporting, and implementation of various service/support/corrective actions via remote communication.

The embodiments of the modular assembly described herein use an exterior housing and/or an accessory cap along with a tablet carrier that contains an electronic device or tablet computer. As described in greater detail herein, the exterior housing optionally includes memory, a controller for communication with the selected tablet computer, one or more batteries, one or more sensors, and/or one or more data capture peripherals (e.g., imager, scanner, or reader). An accessory cap may optionally include memory, a controller for communication with the selected tablet computer and/or exterior housing, one or more batteries, one or more sensors, and/or one or more data capture peripherals (e.g., imager, scanner, or reader), also referred to as functional devices herein.

The memory, controller, batteries, sensors, and/or peripherals can be distributed between the exterior housing and the accessory cap, or in either, or both. In one embodiment, memory, a controller, and sensor components are present in the exterior housing; whereas memory, a controller, sensors, and peripherals are present in the accessory cap. In the another embodiment, the exterior housing is a plastic shell which does not include electronics; whereas memory, a controller, sensors, and peripherals are present in the accessory cap associated with the exterior housing. In yet another embodiment, the exterior housing and accessory cap may be combined into a single integrated module.

The controller(s) contained by the exterior housing and/or the accessory cap are operatively connected to the tablet computer so as to allow communication of power and data between the controller and the tablet computer.

Whether present in the exterior housing and/or the accessory cap, each sensor is configured to sense an environmental condition and wherein the sensed data is capable of being stored within the exterior housing or accessory cap memory independent of the state of the selected tablet computer.

An accessory cap may be optionally attached to the exterior housing and be in communication with the controller.

In addition, the functions associated with the devices provided in the modular assembly, including the environmental sensors and communication capabilities with a server, are also disclosed herein. Accordingly, methods for automatically monitoring and storing environmental conditions of a tablet computer provided with a modular case assembly is also described.

Referring now more particularly to the drawings, FIGS. 1-12 show an electronic device 100 with a modular case assembly 102, or "smartcase," or "modular assembly" (which terms may be used interchangeably throughout this disclosure). In some embodiments, the modular case assembly or smartcase 102 has interchangeable accessories in the form of accessory cap portions. The electronic device 100 shown is a tablet computer. The tablet computer 100 can be any type of tablet computer and is not limited by brand, design, size, or operating system. This includes, but is not limited to, phablets, i.e., mobile devices designed to combine smartphone and tablet functions. As understood by one of ordinary skill in the art, the tablet computer has a core CPU providing tablet hardware set, core operating system, and the ability to add/customize software applications tailed to specific use cases. Tablet computers lack integrated physical keyboards and use the touchscreen interface for user interaction, which may include a virtual keyboard displayed on the touchscreen. This differentiates tablet computers from laptops or other electronic devices where a physical keyboard is attached or needed for user typing. Touch screen sizes may be approximately five inches (e.g., 5.1") to approximately twelve inches (e.g., 12.1"), for example. In some cases, the screens are smaller (approximately four to seven inches) or larger. The tablet computer may have an approximately 5.5 inch to approximately 6 inch diagonal screen size, in accordance with one embodiment. In another embodiment, the tablet computer has an approximately 7" screen size.

For example, the tablet or phablet computer can be a media tablet such as those available on the market (e.g., Google Nexus 7, Apple iPad, Apple iPad Mini, Apple iPhone 6, 6 Plus, 7, 7 Plus, 8, 8 Plus, X, HP Elite x3, Amazon Kindle, Samsung Galaxy Tab (e.g., 2, 3, 4, Pro, 7, 8, 8.4, or 10.1) or Galaxy Note (5, 8.0)) or later manufactured for sale, or a custom designed tablet engine computer. Communication capabilities (e.g., Bluetooth, GPS, LTE, WiFi functionality) can be provided in the tablet computer. Further, the operating system (OS) associated with the tablet computer can be any number of operating systems, including, but not limited to: Android-based, iOS, and Windows, and the software associated with the tablet computer is unlimited. The tablet computer has a touch screen 101 (e.g., projected capacitive type touch screen with 5 points touch controller) and can include any number of sensors associated therewith. Further, the tablet computer has a power source or a battery therein, a power switch for on/off and suspend/resume functions, as well as one or two volume keys, for example. The tablet computer 100 also has its own memory or storage device therein. Other devices, such as LEDs, camera(s), flash, etc., can also be provided in the tablet computer.

Features of a tablet computer that can be used with the smartcase 102 may include, but are not limited to: a current and/or upgradable operating system (OS), dual core processor, on board LPDDR, optional microSD card slot, capacitive touch screen, finger and/or pen input, speakers, microphone, headset jack, optional USB ports, wireless connections, geo-tracking or GPS capabilities, camera (rear or front facing), accelerometer, gyroscope, ambient light sensor, compass, vibrator, power and volume control buttons, and LEDs.

Accordingly, the term "tablet computer" is used throughout this disclosure to describe electronic devices that are hand-held such as tablets or phablets or pads (with touch screens), or other such electronic devices, without limiting a type, brand, and/or features of such devices. The tablet computer 100 as defined herein has phone capabilities in addition to tablet functionality. In some instances, the "tablet computer" may be a smart phone, cell phone or mobile device.

As generally understood, tablet computers can have varying lengths and/or widths, varying camera locations (if at all), and one or more ports (e.g., input and/or output) and external button configurations. The smartcase 102 as described herein is configured for installation and use with any of such devices.

FIG. 1 shows an installed smartcase 102 around the tablet computer 100. The smartcase 102 may include a tablet carrier 10 for encasing a selected tablet computer/electronic device 100 and an exterior housing 12 enclosing the tablet carrier 10. U.S. Ser. No. 14/280,451, filed on May 16, 2014 and patented on May 16, 2017 under U.S. Pat. No. 9,652,002, which is incorporated by reference herein in its entirety, describes features associated with a tablet carrier, a modular assembly and tablet computer that may be utilized with the herein described smartcase 102. Accordingly, although some features of the smartcase are described below, additional features as described in the incorporated '002 patent may also be provided therein. In one embodiment, the tablet carrier 10 comprises features of the incorporated '002 patent. The tablet carrier 10 has a length, width, and depth that accommodates a received tablet computer 100 therein. The tablet carrier 10 may include a top wall, bottom wall or surface, and side walls that surround portion(s) of the tablet computer 100. In an embodiment, the tablet carrier 10 comprises a top portion and bottom portion that are secured together around the tablet computer 100.

In one embodiment, the tablet carrier 10 acts as a support for a range or a variety of consumer tablet computers ranging in size from about five inches to about ten inches, although it is not limited to such examples. For example, each tablet carrier can act as an internal sleeve for containing a selected type of tablet (e.g., a particular brand of a particular size or dimension with a particular operating system and CPU). In an embodiment, the tablet carrier 10 provides access to the one or more ports and the external button configuration of the selected tablet computer. The tablet carrier 10 has an internal configuration that can vary between different carriers 10 to fit/interface properly with different tablet computers, but their external configuration is constant so as to fit/interface with other parts of the assembly external to it (e.g., exterior housing 12). Thus, different internal carriers 10 can be used with common external parts to make the overall assembly modular.

In an embodiment, the tablet carrier 10 is formed to support a pre-selected tablet computer. For example, the tablet carrier 10 may be formed such that openings 8 (see FIGS. 2A and 2B) or other parts allow access to buttons and other functional devices (e.g., a camera, LEDs, ports) are accessible through the tablet carrier 10 and the external housing 12 (which may similarly include openings 103 and other parts) for a particular selected device/tablet computer 100. The shape and/or size of such openings 8 or parts may correspond to devices on the tablet computer 100 and different configurations and/or placement of such openings and parts will be understood by one of ordinary skill in the art. In one embodiment, material (e.g., PC or similar material) may be provided in the smartcase 102 to cover one or more of the openings. For example, as shown in FIG. 2B, pieces of clear material may be secured (e.g., via clear/non-visible adhesive or glue) as windows 9 between aligned openings 103 of the external housing 12 and openings 8 of the tablet carrier 10.

According to one embodiment, the tablet carrier 10 is a case for a tablet, phablet, phone, or electronic device that is marketed or sold for a particular electronic device/tablet, and the external housing 12 and/or accessory cap 19 is configured to cooperate and/or compliment such a tablet carrier 10. In one embodiment, a tablet carrier 10 and accessory cap 19 are configured to connect and cooperate (e.g., such as shown in and described with reference to FIGS. 26A-26G, later below).

In one embodiment, buttons on the tablet computer 100 may pass through openings in the tablet carrier 10 to the exterior housing 12, such as by mechanical methods, e.g., plastic button extension caps.

Figure 2B:
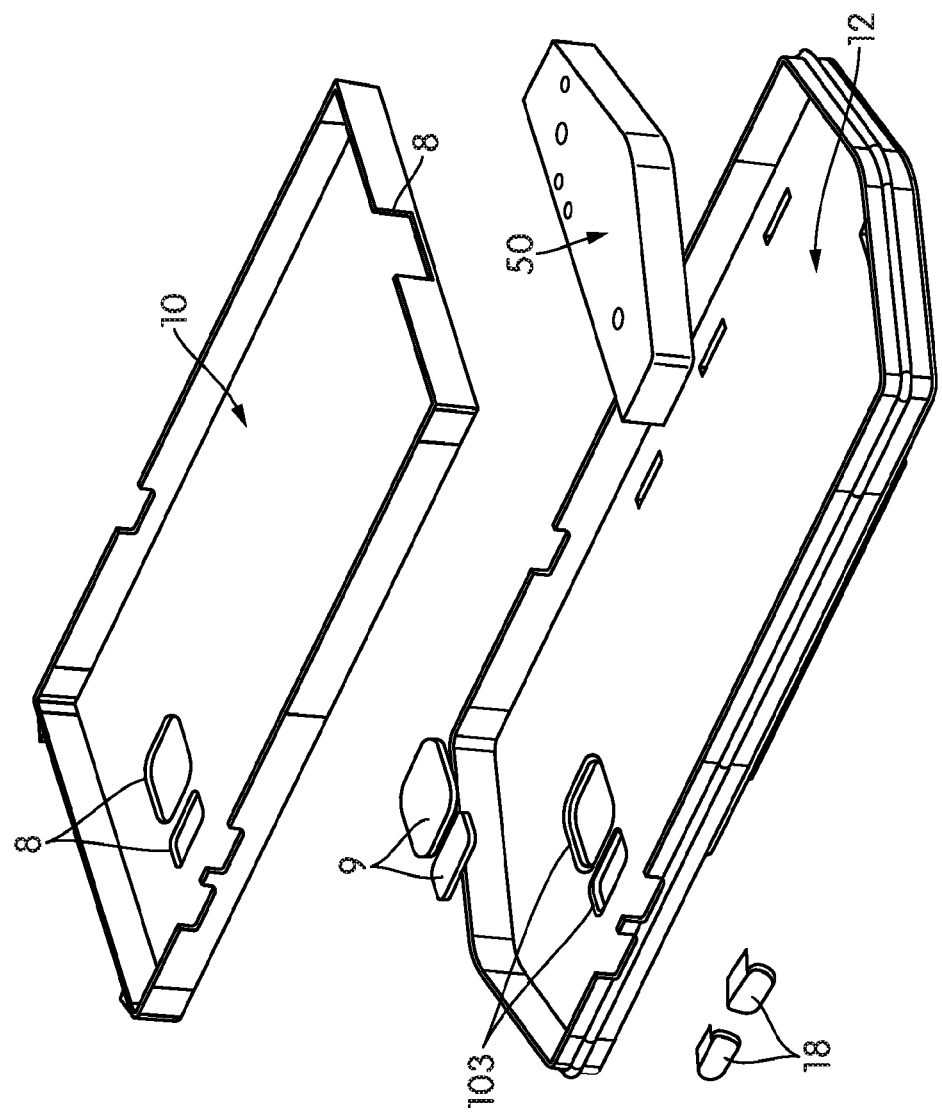
Figure 16:
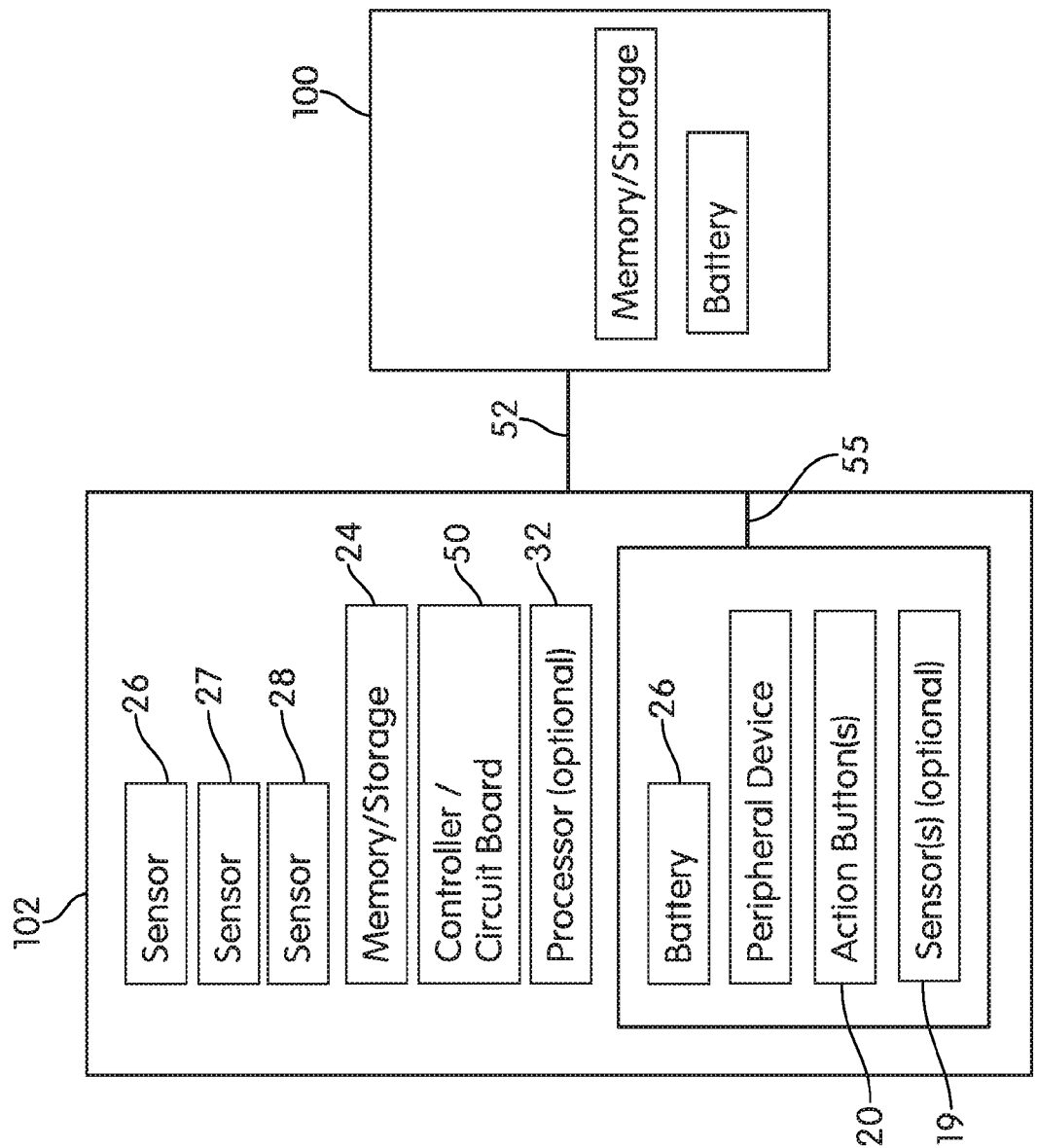
FIG. 16 is a schematic diagram of the system architecture for the smart case in accordance with an embodiment.

The tablet carrier 10 may interconnect with the selected tablet computer 100 being utilized via a connector or by simply receiving and fitting (e.g., via snap-fit connectors)

the tablet computer 100 therein, such as, shown in FIG. 2, FIG. 2A, and schematically in FIG. 16. The exterior housing 12 may interconnect with the selected tablet computer 100 via connector 52. An example of one type of connector 52 is shown in FIGS. 26A-26C and 26E-26F, for example, which may be manually connected and disconnected to the tablet carrier 10 and/or tablet computer 100. The connector 52 may be a plug in device designed to be inserted in/connect to a port of the electronic device to establish communication between the smartcase 102 and tablet computer 100. In an embodiment, the tablet connector 52 is in the form of a USB cable or other type of data carrier that extends from a main circuit board 50 of the exterior housing 12. A "connector" is defined as a device or system that is used to connect devices, e.g., tablet computer 100, exterior housing 12, accessory caps 19, and/or battery(ies) 22, for communication purposes. The connector 52 may be altered or changed based on the type of tablet computer 100 selected for use with the smartcase 102. In some embodiments, the connector 52 may be altered or changed based on the type of tablet carrier 10 (including commercially available carriers or cases) and/or exterior housing 12 used with the tablet computer 100. In some embodiments, noted further below, a mechanical and/or electromechanical interface may be provided on the exterior housing 12 for connection to a carrier 10 or case (including commercially available cases).

The tablet carrier 10 and exterior housing 12 may include cut-outs or openings that can provide access to the one or more ports and buttons of a tablet computer 100 when the tablet computer 100 is received in and encased by the carrier 10 (and external housing 12). These access areas or openings may be provided in one or more side walls, for example. In an embodiment, the openings of the tablet carrier 10 are configured for alignment with buttons existing on a selected tablet computer 100. For example, the openings may be respectively associated with a power button and one or more volume buttons provided on the tablet computer 100. The tablet carrier 10 may also include one or more apertures for alignment with indicators and/or a camera, so as to allow for functional operation thereof.

The tablet carrier 10 also includes either an opening or an additional conductive layer/cover for providing access to a touch screen 101 of the tablet computer 100.

As shown in FIG. 2A and represented via FIG. 2B, in one embodiment, the tablet carrier 10 may be enclosed by the exterior housing 12. The exterior housing 12 provides overall enclosure and protection of the tablet computer 100 and components housed therein. The exterior housing 12 has a length and a width (and optionally, a depth) suitable to enclose the tablet carrier 10, in accordance with this exemplary embodiment. In an embodiment, the exterior housing 12 may possess an upper portion 14, a lower portion 16, and, in some embodiments, an accessory cap 19 removably attached thereto (e.g., to a back or rear part of the housing). As shown in FIGS. 5 and 6, for example, the upper portion 14 may be designed to surround at least an upper half of the tablet carrier 10 and tablet computer 100, while the lower portion 16 extends around a lower portion of the tablet carrier 10 and tablet computer 100. The lower portion 16 may slide around a bottom part of the tablet carrier 10, while the upper portion 14 slides around the top part, and the upper and lower portions 14, 16 are connected together. The exterior housing 12 has an opening or layer/cover for providing access to a touch screen 101 of the tablet computer 100, as well as one or more buttons 18 thereon for activating buttons of the tablet computer 100 (via an actuator that is part of the tablet carrier 10, for example).

In one embodiment, the exterior housing 12 is formed to support a pre-selected tablet computer. For example, the exterior housing 12 may be formed such that it encases the tablet carrier 10 and the exterior housing 12 (which may similarly include openings and other parts) may be designed for a particular selected device/tablet computer 100. In an embodiment, buttons on the tablet computer 100 may pass through openings in the tablet carrier 10 to the exterior housing 12, so that pushing button(s) 18 causes application of force through the tablet carrier 10 to depress native button(s) on the tablet computer 100. The exterior housing 12 may optionally include other features that coincide with features of the tablet computer 100 contained therein, e.g., a cover with holes therein to align with a speaker (so as not to compromise quality of any audio output), though such features are not necessarily illustrated in the Figures.

Figure 26B:
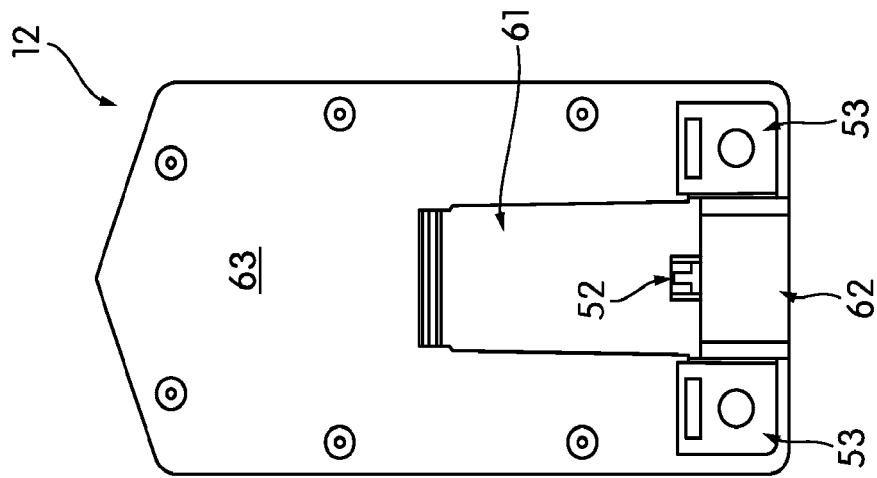
Figure 26A:
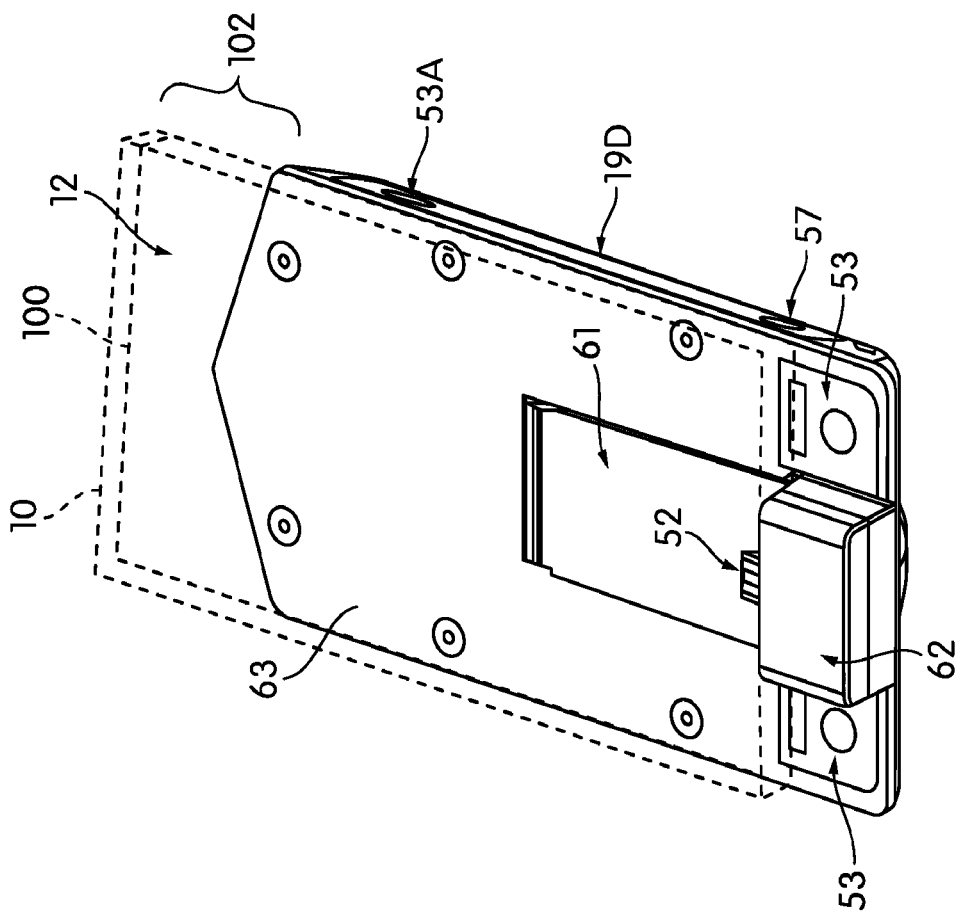

In another embodiment, the exterior housing 12 may have a length and width that is suitable for placement on or cooperation with a tablet carrier 10. For example, the exterior housing 12 may be connected to a tablet carrier 10. FIGS. 26A-26G show an alternative example of an exterior housing 12 with an accessory cap 19D attached or incorporated thereon. In accordance with an embodiment, the exterior housing 12 is designed to fit upon either proprietary or generally-commercially available cases or tablet carriers 10 for tablet computers 100, e.g., mobile/smartphones, phablets, or tablets. For clarity purposes only, the tablet carrier 10 and tablet computer 100 are represented schematically in dashed lines in FIGS. 26A and 26F. The exterior housing 12 (and cap 19D) includes a length and a width that may be smaller than a length and width of the tablet carrier 10, in accordance with an embodiment. As shown in FIGS. 26A and 26B, for example, the exterior housing 12 may include a plate 63 that has an interface 61, on a first or front side, that is designed to cooperate or compliment an exterior of a tablet carrier 10 and mechanically and/or electrically connect and interface therewith. For example, the interface 61 may be positioned adjacent to, or aligned with, a back portion of the case or tablet carrier 10 that contains the tablet computer 100, and designed to attach or connect therewith. In one embodiment, the interface 61 has a mechanical connector component, e.g., a clip, alignment surface, pin(s), magnets, etc. In an embodiment, the interface 61 includes the connector 52. The connector 52 may be provided on a platform 62 that extends (forwardly) from the plate 63 in order to position the connector 52 such that is connects to a port on a bottom portion of the tablet computer 100 contained in the tablet carrier 10. However, such a platform 62 is not intended to be limiting, and the platform and connector 52 need not be provided. The type of interface 61 or connector is not intended to be limiting, however. Ferromagnetic plates and/or contacts may be provided on a surface of the plate 63 and/or interface 61 of the exterior housing 12—separately or in combination with a mechanical interface or connector—to act as an interface for docking and/or charging the associated tablet computer 100 and its carrier 10. The interface 61 may be used to establish communication between the controller 50 in the cap 19D (and/or exterior housing 12) and tablet computer 100 (provided in the carrier or case). Optionally, USB-C contacts may be provided on the exterior housing 12. On an opposite (second) side of the plate 63, the housing may be provided. In one embodiment, the accessory cap 19D is provided on the opposite side of the plate 63. In an embodiment, the length, width, and a depth of the exterior housing 12 may be based on the size, shape, and peripherals of the accessory cap 19D and the components contained in either the housing 12, cap 19D, or both. Vice versa, the size, shape, and peripherals associated with the accessory cap 19D may based on the exterior housing 12 configuration (and/or the tablet carrier 10 features). In some embodiments, accessory cap 19D is removably attached to the exterior housing 12 (e.g., removably attached to a back of plate 63 or rear part of the housing). In some embodiments, the accessory cap 19D is attached to the plate 63. When the exterior housing 12 is connected to the tablet carrier 10 and/or tablet computer 100, the exterior housing 12 need not enclose or surround the tablet carrier 10 in its entirely, in accordance with an embodiment. It may cover a portion of the back of the tablet carrier 10, for example. A top portion of the exterior housing 12 may extend to a middle of the tablet carrier 10, for example. In one embodiment, the top portion of the exterior housing 12 (or top of the accessory cap 19) is positioned a distance below a top of the tablet carrier 10 and tablet computer 100, but at or above a center or middle of the tablet carrier 10. Further description of the features shown in FIGS. 26A-26G is provided later below.

In an embodiment, the exterior housing 12 is a formed (e.g., molded) housing designed to connect, contain and/or support the tablet carrier 10 and tablet computer 100 therein. The method(s) of forming the housing 12 and/or carrier 10 and its parts are not intended to be limited. One or more parts may be molded or overmolded and/or configured to be assembled together via force (e.g., press-fit together) and/or mechanical securement devices (including bolts, screws, snap fit mechanisms, lugs, etc. as well as adhesive or glue), for example.

In an embodiment, the exterior housing 12 contains electronics therein; for example, the exterior housing 12 may include memory 24 or storage (see FIG. 16, FIG. 26G), at least one controller/circuit board 50 for communication with the selected tablet computer, an optional processor 32, as well as additional mechanical/electrical components that interface with the buttons/ports of the selected tablet computer 100 (directly or via tablet carrier 10). The controller and/or processor 32 can be provided in the form of and/or provided with the circuit board 50, for example, such as shown in FIG. 2A. The controller/main circuit board 50 are operatively connected to the one or more ports of the tablet computer 100 (e.g., via connector 52) so as to allow communication of power and data between the controller and the tablet computer 100. For example, the connector 52 may be inserted through an opening 8 (see FIGS. 2A and 26F) provided on a bottom of the tablet carrier 10 and connect into a receiving port provided on a bottom of the tablet computer 100. The smartcase parts can be connected for communication without requiring special software drivers or base tablet modification.

Throughout this description, it should be understood that reference to a "controller" includes a single controller or multiple (sub-) controllers that control specific functions related to devices including, but not limited to, the herein described tablet computer 100 and functional device of the accessory cap 19 (when provided). In the case of multiple controllers, such controllers can, but need not be, physically combined into a single device. Further, although the description may refer to circuit boards being used as controllers, for example, it should be understood that any type or number of controllers can be used. The use of a circuit board, as shown in the Figures, is not intended to be limiting.

The at least one circuit board 50, also referred to as a controller board, is configured to monitor, control, and/or contain management of the battery supply, provide intelligence, etc. with regards to the tablet computer, and, when accessory cap 19 is provided, monitor and control functions and a functional device of the accessory cap 19. For example, the circuit board 50 can be used to monitor and determine when the tablet computer 100 is losing power, and can use its controller to increase power from a housed battery 22 within the accessory cap 19 (described below) or other location. The controller can be any type of microcontroller or microprocessor. In an embodiment, the controller 50 is provided in the form of a pair or stacked set of main controller boards (50 in FIG. 2A) and a separate sensor/LED board 51, e.g., shown near a crown of the device/tablet computer 100. The sensor/LED board 51 is part of and/or operatively communicates with controller/main circuit board 50, for example. In an embodiment, the tablet carrier 10 and/or the exterior housing 12 may include capacitive touch programmable button portion(s) or area(s) 53. Electromechanical and/or resistive touch detection technology may also or alternatively be included as button portions to detect button press events. The circuit board 50 includes a generalized set of electrical interfaces that ensures compatibility with a variety of different accessory caps that are attached to the housing 12.

The circuit board 50 may be connected to the tablet computer 100 using tablet connector 52, such as a USB connector or other connector that can communicate both data and electrical power, as shown in FIGS. 2 and 2A and that is compatible with iOS, Android, and Windows devices. The tablet connector 52 is plugged into a slot or data communication port in the bottom of the tablet computer 100, for example (e.g., through an opening 8 in the tablet carrier 10).

In accordance with an embodiment, one or more sensors are provided in the herein disclosed modular case assembly. The sensor(s) are configured to communicate their collected data to the processor 32 and/or controller/circuit board 50. In one embodiment, the sensors are provided within the external housing 12 (shown schematically in FIG. 16 as sensors 26, 27, and 28). In an embodiment, all electronics, including the controller/circuit board 50, 51, as well as other devices (batteries) are provided in the exterior housing 12.

In another embodiment, one or more sensors are provided in the accessory cap 19. In yet another embodiment, the accessory cap 19 includes some electronics (with or without sensors). In still yet another embodiment, the exterior housing 12 and accessory cap 19 cooperatively combine and operatively connect to sense, communicate, and provide sensors and electronics.

Any number of accessory caps 19 are configured for installation (e.g., via alignment and locking) with the exterior housing 12 (e.g., on a backside thereof) in accordance with embodiments herein. An "accessory cap" as referred to herein is a removable module that contains one or more functional components and that may be attached to and removed from the external housing 12. The accessory cap may be secured to the housing 12 in a number of ways, and in different locations, e.g., on an end of the housing (e.g., top and/or bottom) or on a back or rear of the housing. For example, as shown in FIGS. 5 and 6A, the accessory cap 19 may be aligned with the exterior housing, slid (e.g., along rails) onto the back of the housing, and, in one case, optionally secured via attachment or connection of the lower portion 16 to the upper portion 14. The accessory cap 19 may be removed and replaced by another accessory cap in a similar manner. An electrical contact may allow the functional device of the accessory cap 19 to communicate with the components (e.g., controller 50, 51) in the exterior housing 12, in one embodiment. In another embodiment, the accessory cap 19 may have a connector designed to plug into a port (e.g., USB) on the tablet computer 100. The accessory caps 19 can be fully mobile when installed (e.g., see FIG. 1) or stationary, e.g., in a docked configuration (e.g., see FIG. 14). The accessory cap 19 is configured to provide a function via a functional device that, when coupled (e.g., via a connector) with the exterior housing 12 and tablet carrier 10, provides tailored functionality to the tablet computer 100 via communication with controller 50. In one embodiment, the accessory cap 19 includes its own controller and circuit board therein.

Figure 15:
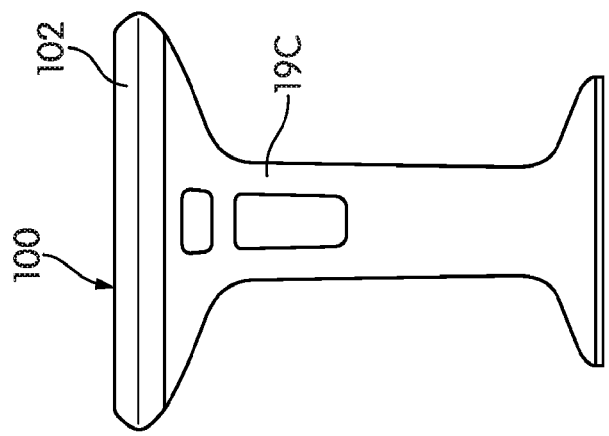
FIGS. 14 and 15 show right side and top views of an electronic device with a different accessory cap installed on the smartcase in accordance with still yet another embodiment of this disclosure.
Figure 14:
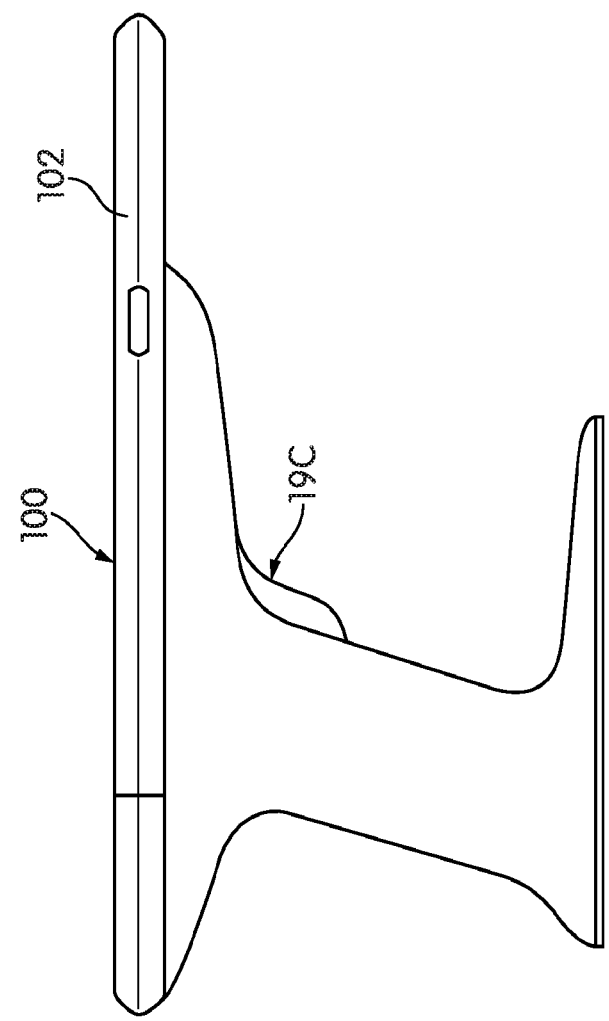

As an example, FIGS. 7-9, 10A, and 10B illustrate a card reading accessory cap 19A with a receiving slot 64 associated therewith. The peripherals associated with the accessory cap 19 of the smartcase 102 may include readers and scanners, such as a barcode scanner, magnetic stripe/card reader, point of sale (POS) card readers, RFID tag reader, EMV card reader (support and/or chip and pin access reading/interface capability), serial DB9, laser distance, thermal/IR imager, UV imager scientific instrument, $CO_2$ sensor, and the like. FIGS. 11-12, 13A, and 13B show views of an electronic device and smartcase with an installed accessory cap 19B having a peripheral component (functional device) in the form of a barcode scanner. FIGS. 14-15 show views of an electronic device with an accessory cap 19C in the form of a pistol-type barcode scanner installed on the smartcase in accordance with an another embodiment.

Any of the accessory caps and/or exterior housings disclosed herein may, in accordance with an embodiment, include a variably-sized battery subsystem therein that is designed to support the functionality of the noted embodiment. That is, the size, shape, and features (including capacity) of the battery included within the cap, housing, or smartcase may be varied to accommodate and/or best meet needs of a specific combination of sensors and peripherals needed for a specific use case. In an embodiment, the battery size, shape, design, and features may be interchangeable (e.g., increased or decreased) not only based on specific use (i.e., the sensor(s) and peripheral(s)), but also based on user requirements; that is, the battery may be removed and switched, in either the housing or cap, with another battery (of different type, capacity, size, shape, etc.).

In yet another embodiment, multiple sensors may be provided in the smartcase 102, e.g., in both the exterior housing 12 and the accessory cap 19.

Generally, it should be understood that no matter the placement of the sensor(s) in the smartcase 102, the sensor(s) are configured to communicate with a processor (e.g., processor 32) and/or controller (e.g., controller/circuit board 50) and connected to the tablet computer 100 via said controller. In some cases, multiple controllers may sit between a sensor/peripheral and the tablet computer 100.

Figure 6B:
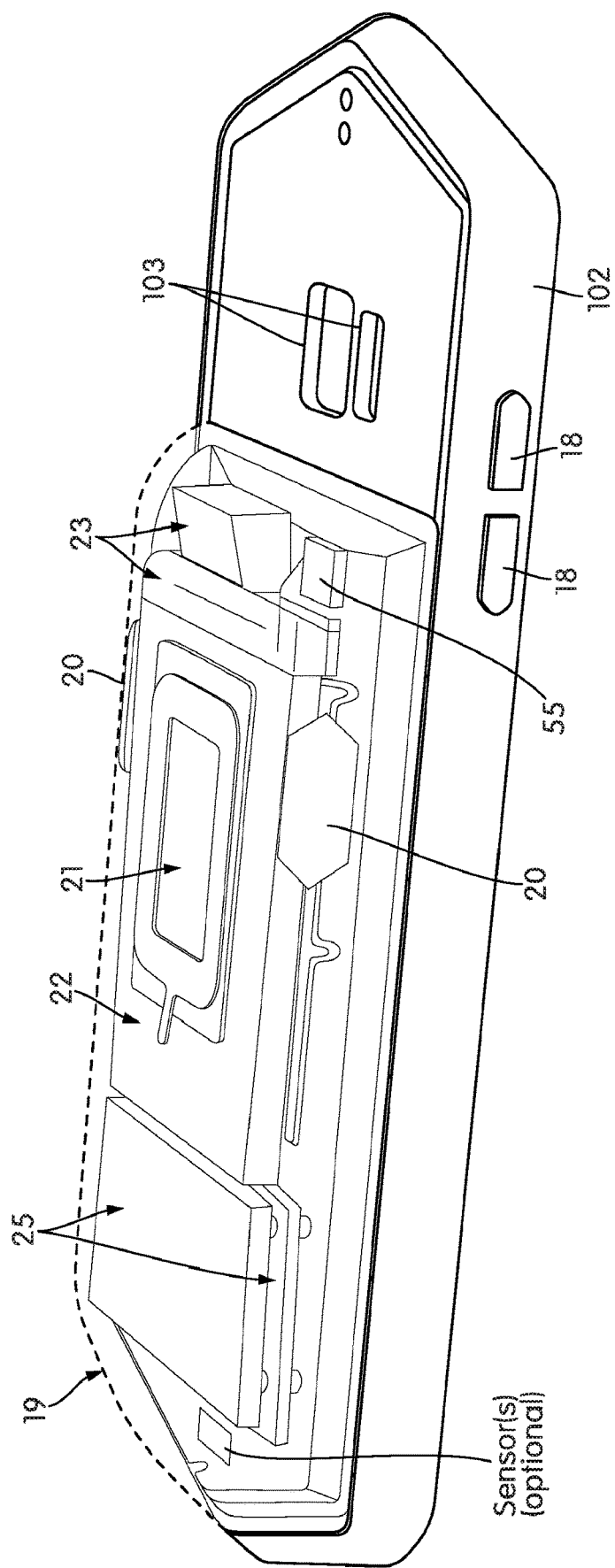
FIG. 6B is a plan view of the accessory cap showing parts contained therein.
Figure 10A:
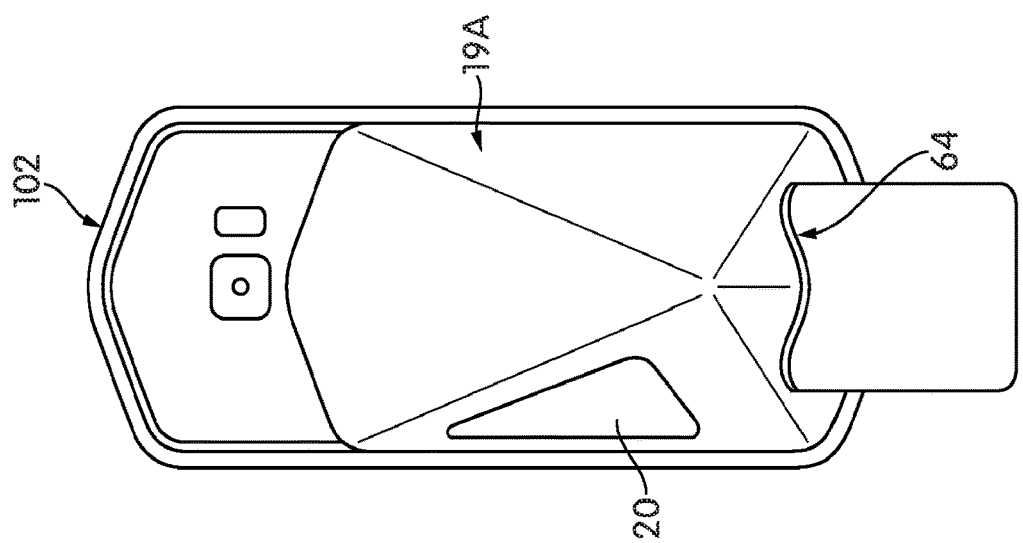
FIGS. 7-9, 10A and 10B show left side, front, right side, back, and plan views, respectively, of an electronic device and smartcase with an installed accessory cap in accordance with another embodiment of this disclosure.
Figure 9:
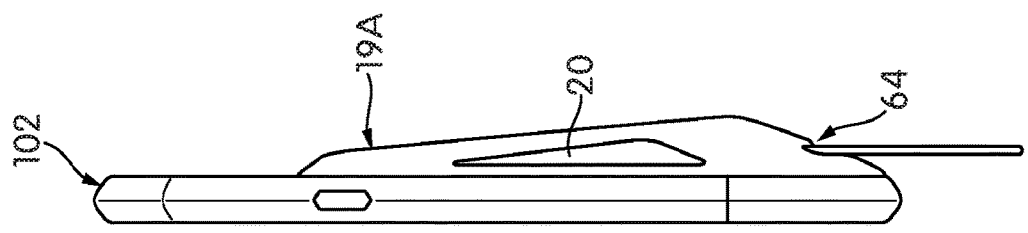
Figure 8:
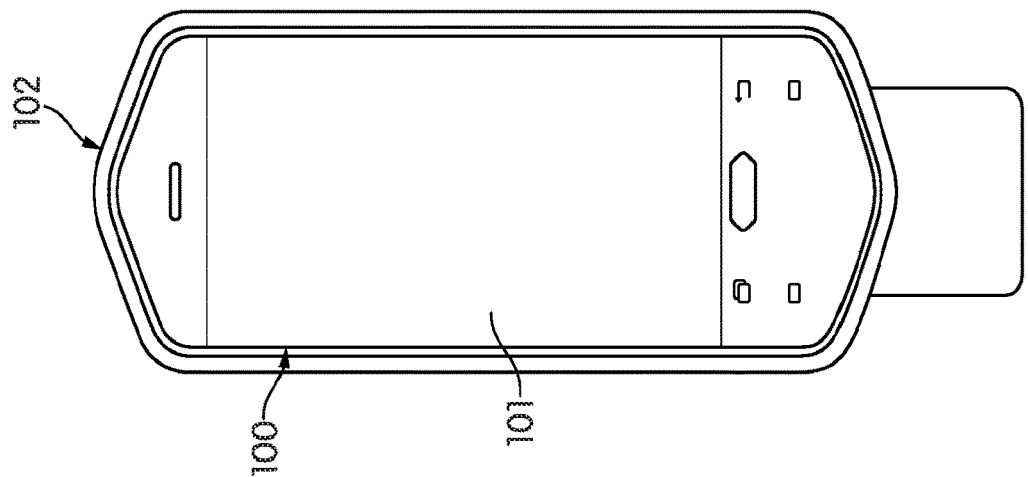
Figure 7:
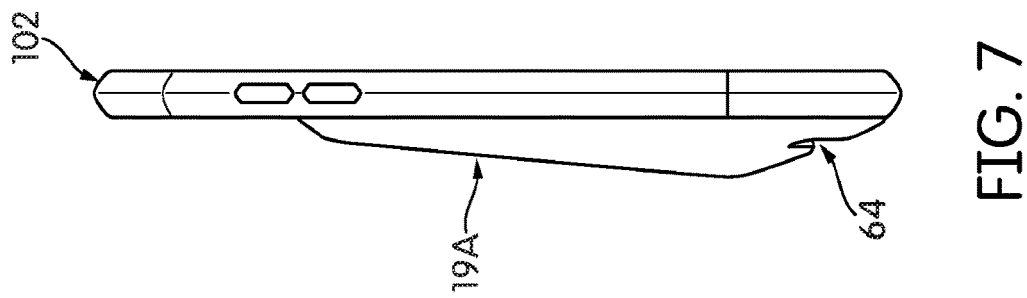
Figure 10B:
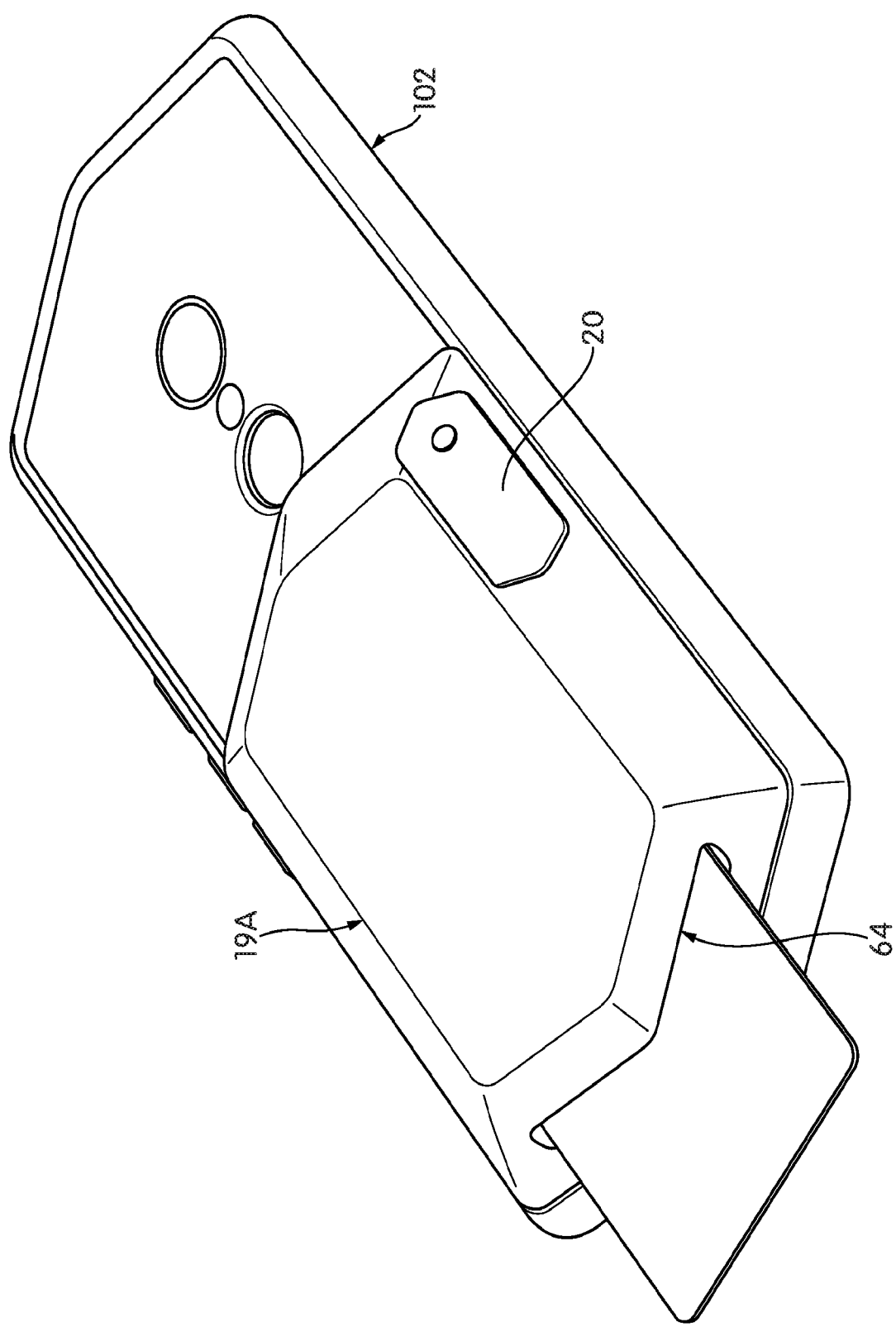
Figure 13B:
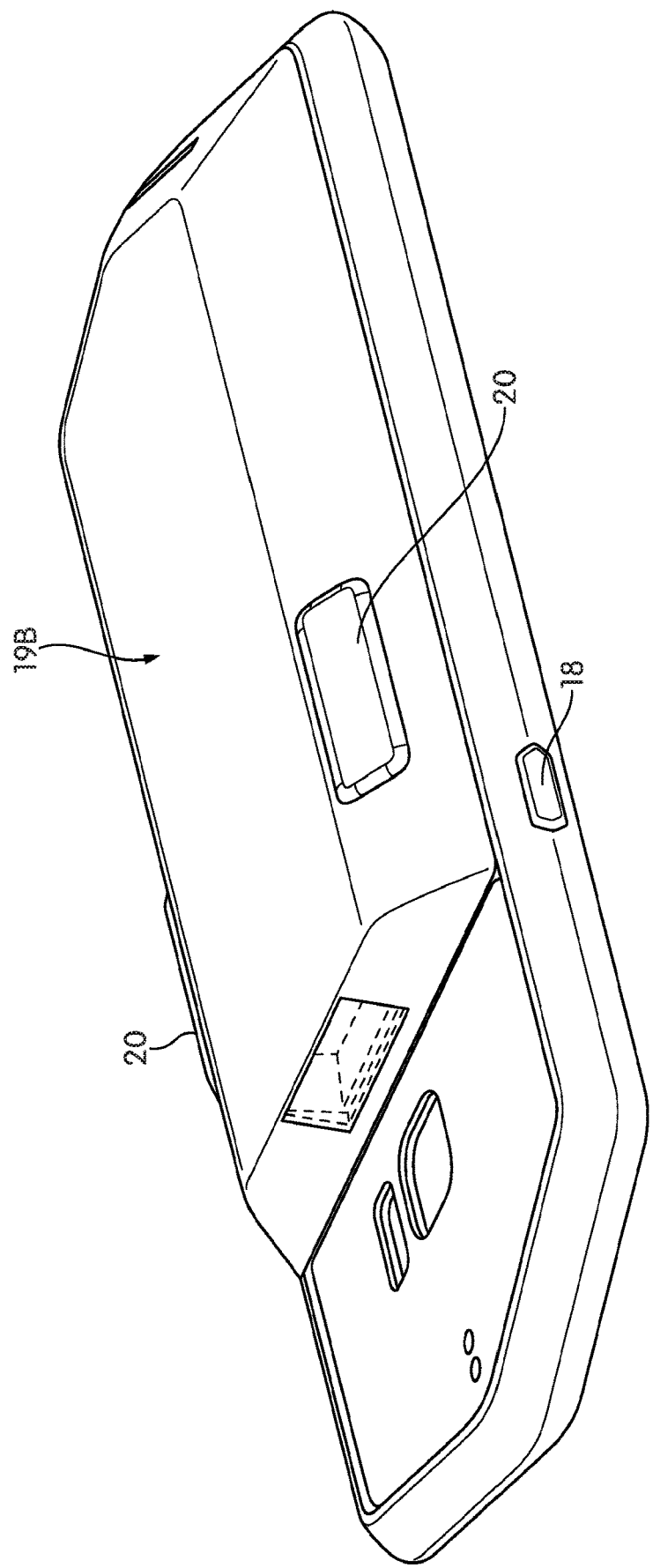

One or more functional devices can be housed within the accessory cap 19 to implement an intended function. FIG. 6B is a plan view of one embodiment of an accessory cap showing parts contained therein. Such devices may include, for example, a battery 22 (shown with an inductive charging coil 21) (e.g., Qi standard for wireless charging) and one or more action buttons 20, in addition to the mechanical and electrical parts associated with the added peripheral function. For example, FIG. 6B illustrates an exemplary embodiment wherein the accessory cap 19 further contains parts 23 associated with a barcode imaging device as well as parts 25 associated with an EMV card reader (that are not intended to be limiting). FIG. 26C shows another example of parts for a barcode scanner 23 associated with accessory cap 19D. The battery 22 may supply power to the components within the exterior housing 12 of the smartcase 102 and accessory cap 19, in some embodiments (e.g., once the accessory cap 19 is mounted and secured as part of the exterior housing 12). In another embodiment, an accessory cap under local power (i.e., using its own battery) can gather data and perform functions when not attached to the external housing 12. Examples of using accessory cap(s) to gather data are further described later.

In one embodiment, the inductive charging coil 21 in the accessory cap 19 is used to wirelessly charge the battery 22 contained within the accessory cap 21. In an embodiment, a connector 55 is provided in the accessory cap 19. The connector 55 may be a USB Type C (USB-C or micro-USB) connector for power and communication. For example, in addition or alternatively to the coil 21, the connector 55 may be used to charge the battery 22 within the accessory cap 19 (e.g., the connector 55 may receive a portion associated with a plug). The connector 55 may also or alternatively be used for communication purposes, e.g., to provide a wireless or wired/physical connection to transfer data to/from the smartcase 102, to/from the tablet computer 100, and/or to/from a server or remote device (e.g. from its own storage or memory (24) contained within the accessory cap). In an embodiment, the connector 55 connects the accessory cap 19 to the exterior housing 12 (e.g., see FIG. 16) for communication therewith, which thereby may further connect the accessory cap 19 to the tablet computer 100 (via connector 52) to establish communication therebetween. The battery in the accessory cap 19 can also optionally extend the battery life of the tablet computer 100. The at least one battery 22 and the controller/circuit board 50 are operatively connected to the tablet computer 100 so as to allow communication of power and data between the controller 50, the tablet computer 100, and a functional device of the accessory cap 19 in an embodiment.

In one embodiment, the exterior housing 12 may also or alternatively contain a battery.

The size or type of battery included in the smartcase 102 for extending battery life and/or providing power to the peripherals or tablet computer is not intended to be limiting. In one embodiment, the battery capacity of battery 22 may be within a range of approximately 1000 mAh to approximately 3000 mAh (both inclusive). Also, including battery 22 in the smartcase 102 does not limit the ability to charge the tablet computer 100 and/or smartcase 102; in one embodiment, in addition to the battery 22, the smartcase 102 enables both wired and wireless charging options to charge the tablet computer 100 and/or peripherals/accessories in cap 19 and/or exterior housing 12.

When attached to external housing 12, the accessory cap 19 is configured to communicate with the controller/circuit board 50 (and thus the tablet computer 100) via a connector (e.g., contact portions or other electrical contact). In an embodiment, the circuit board 50 includes a connector device that connects to a connector (e.g., connector 55) of the accessory cap 19. The action button(s) 20 may be used to implement the action taken by the peripheral (functional device) associated with the accessory cap 19, for example, and communicate data from the controller 50 to the tablet computer 100.

Although the connectors have only been generally described above, and in some cases noted as physical connectors, it should be understood that the smartcase 102 is not limited to such devices. Rather, a connector (and/or a connector device) may, in some embodiments, be provided and implemented via a wireless connection, e.g., using a short-range wireless technology, such as Bluetooth®, to connect and allow communication between the accessory cap 19, the [enclosed] selected tablet computer 100, controller 50, sensors 26-28, and/or batteries (e.g., via their circuit boards).

The functions and functional devices (peripherals), sensors, and/or modules of the accessory cap portions 19 provided as part of the smartcase 102 are not intended to be limited. The accessory cap functions may include, but are not limited to, providing enhanced durability and shock/vibration protection; providing one or more of: speaker(s), microphone(s), camera(s) and associated accessories (e.g., flash), gaming buttons, audio jack, and a DC jack; providing printing capabilities such as a receipt printer (e.g., thermal printer); providing secure swipe support with magnetic card reader (e.g., read-only and read-write capabilities); providing enhanced payment features such as EMV/NFC support for contactless payment applications (e.g., for credit cards or other cards with NFC communication) and/or providing smart card reader, support and/or chip and pin access reading/interface capability (see FIGS. 7-10B); providing I/O expansion; providing RFID, HDMI and/or USB reading and/or host capabilities; providing biometric identification (ID) swipe/security module such as a fingerprint scanner; providing a laser bar code scanner (e.g., 1-D and 2-D laser barcode scanning capabilities) or other scanning capabilities; and providing a battery and/or a power booster, such as hot swappable battery solutions that add capacity and wireless charging of the tablet in either a plug-in format (e.g., a power charger in the form of an upright stand) or as a mobile or portable battery device, acting as its own power source, in the accessory cap which may be used to supply power to the [enclosed] tablet computer 100. The functions of the accessory cap 19 can be tailored for and/or in communication or use with customer relationship management (CRM) applications, mapping/intelligent routing applications, scanning applications, IMU/GPS/geo-tracking applications, hosted content management and delivery applications, image capture and/or upload applications, serial DB9, laser distance, thermal/IR imager, UV imager scientific instrument, and sensing capabilities (e.g., CO2 sensor), and the like, which may be provided in the circuit board 50 and/or the tablet computer 100.

In accordance with an embodiment, the accessory cap 19 is configured to be interchangeable with one or more replacement caps comprising different functional devices providing different functions. In one embodiment, the accessory cap 19 can have its own electronics or circuit board that is connected via connectors to circuit board 50.

Moreover, a location of parts and the devices on or within the accessory cap 19 is also not limited. For example, a receiving slot for a credit card may be provided on a side of the accessory cap 19, for swiping a card therethrough, and include a magnetic strip reader (MSR) device and/or writer, which can be used for sliding credit card(s) and/or other cards with magnetic strips therethrough (instead of, or in addition to, the chip card reader shown in FIGS. 7-10B). When assembled and activated for use, the magnetic strip reader can read information from a card that is swiped through the receiving slot, and communicate such information for processing and/or use via circuit board(s) and then to tablet computer 100 to complete a transaction, for example.

In an embodiment, more than one accessory cap may be provided as part of the modular assembly or smartcase 102. For example, a first accessory cap can provide a different function than a second accessory cap. Additionally, in accordance with an embodiment, the accessory cap 19 may be simply used to provide additional battery power and memory/storage in the smartcase 102.

Accordingly, it should be understood that any number of modular assemblies can be manufactured and installed on tablet computers to provide multiple assemblies with one or more peripheral functions included in the accessory cap portions.

In an embodiment, the tablet carrier 10 and/or exterior housing 12 and/or accessory cap may include one or more indicators in the form of lights or LEDs, for example. Each of the indicators may be illuminated when power is supplied to the tablet carrier 10 and tablet computer 100. In an embodiment, LEDs are implemented within the tablet carrier 10 and are configured to indicate a specific action associated with the smartcase 102. For example, the LEDs may change their emittance pattern and/or color(s) when a specific action is applied by a user, or if an action needs to be taken by a user (e.g., the LEDs may change color if the battery state of charge is low, if communication with the tablet computer 100 is lost, or if accessory cap 19 is removed). The application of LEDs and/or other indicators in such a manner should be understood by one of skill in the art and therefore is not further explained in detail herein.

In an embodiment, the tablet carrier 10 and/or exterior housing 12 and/or accessory cap may also or alternatively include one or more programmable buttons. The programmable button(s) can be used for communicating with the tablet computer 100 to implement a specified function via at least the circuit board 50 when connected for communication with the corresponding tablet computer 100. Programmable button(s) allow for ease of programming and tailoring of tablet functionality. The programmable button(s) can be associated with a controller that is configured to automatically actuate or implement the assigned function. It can be provided on any side or surface of the smartcase 102.

One or more of the button(s) associated with the tablet carrier 10 and/or external housing 12 and/or accessory cap may include one or more LED lights therein and may be programmable to illuminate or light up once a command is received, in accordance with embodiments herein. For example, the LEDs may change their emittance pattern and/or color(s) when a specific action is applied by a user, or if an action needs to be taken by a user (e.g., the LEDs may change color if the battery state of charge is low, if communication with the tablet computer 100 is lost, or if a command is received via a remote server (e.g., server 70)). The user can activate or push the button(s) to acknowledge the indication.

The exterior housing 12 and/or tablet carrier 10 and/or accessory cap may include a combination of two or more of: non-illuminated programmable buttons, illuminated programmable buttons, and/or covers for buttons (to activate a native button on the tablet computer), in accordance with an embodiment.

In an embodiment, the one or more programmable buttons are configured to electromechanically actuate a button on the tablet computer 100. One or more actuators for actuating the one or more buttons on the tablet computer 100 can be provided on the tablet carrier 10 and/or the exterior housing 12. An "actuator" in this disclosure refers to a device (alone or part of a system) that is configured to actuate (e.g., press) one or more buttons on the tablet computer. The one or more programmable button(s) are configured to cause at least one of the one or more actuators to actuate its corresponding button. An actuator such as a solenoid (or microsolenoid) and/or solenoid driver can be utilized, for example, in accordance with an embodiment. In another embodiment, a shape memory material can be used as an actuator. In another embodiment, a mercury switch can be used as an actuator. In yet another embodiment, compressed air may be used as an actuator. For example, a device such as a CO2 cartridge may be provided in the carrier 10 to apply a force of compressed air to actuate the buttons on the tablet computer 100. The type of actuator provided in the smartcase 102 is not intended to be limited. In some cases, no actuator is provided and the button provided on the tablet carrier 10 and/or exterior housing 12 is simply a cover for another button.

Figure 17:
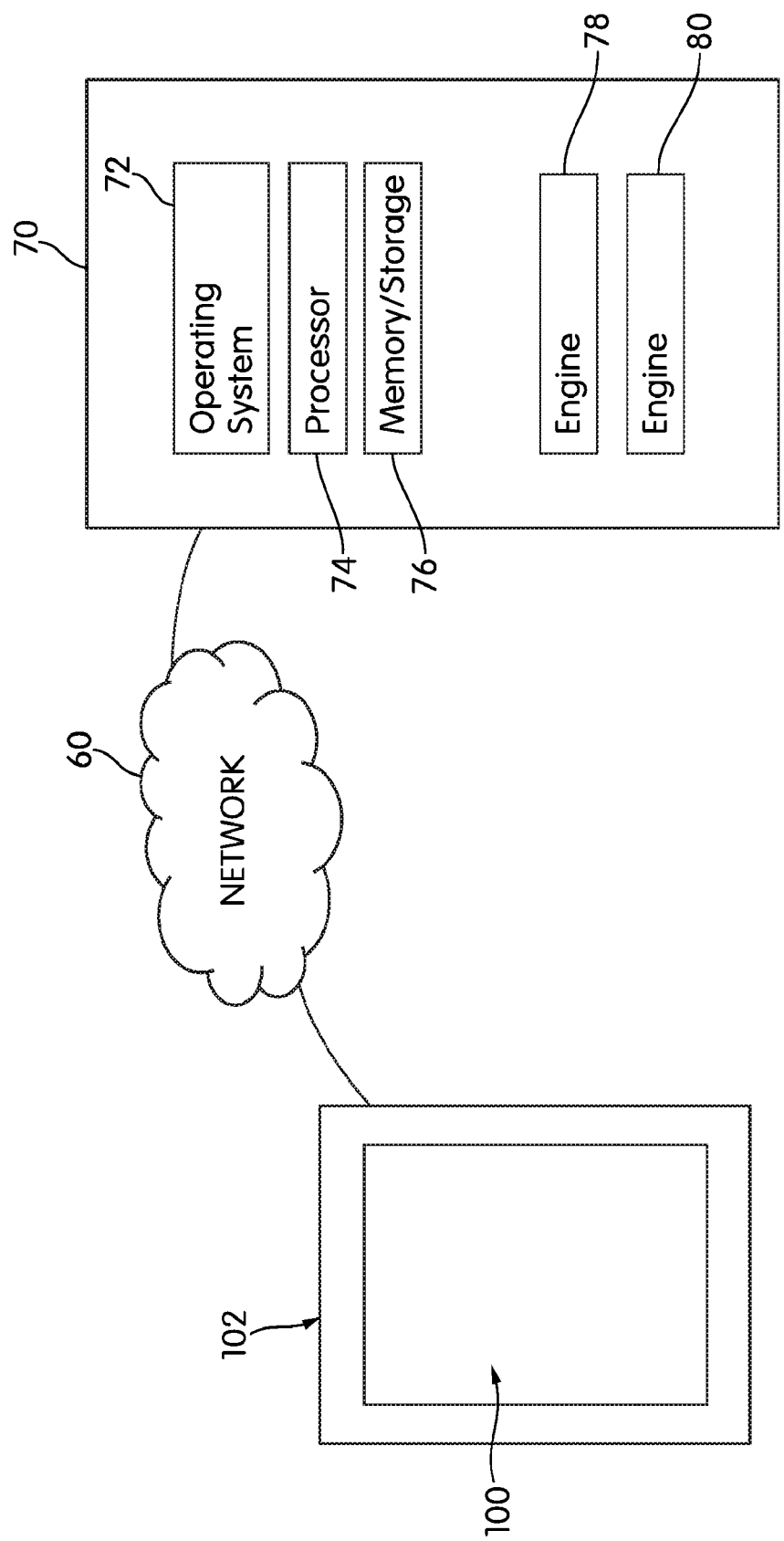
FIG. 17 is a schematic diagram of the electronic device and smartcase communicating with a remote server via a network in accordance with an embodiment.

In an embodiment, the one or more programmable buttons present on the exterior housing 12 and/or tablet carrier 10 and/or accessory cap may be configured to trigger logic within a program, or an application associated executing on the tablet computer 100 or the cloud-based system in FIG. 17.

In an embodiment, the modular assembly or smartcase 102 may also or alternatively include at least one programmable button that uses capacitive or resistive touch detection technology to detect button press events and actuates a program or function on the tablet computer 100.

The programmable button(s) can cause at least one of the one or more actuators to actuate its corresponding button on the tablet computer 100. Particularly, in accordance with embodiments herein, the corresponding button(s) are activated remotely by pressing the programmable buttons. That is, the programmable button(s) may not necessarily be configured to be in direct alignment with the buttons on the tablet computer, but, rather, the programmable buttons may be provided in a different location from the buttons on the tablet computer, and thus are configured to actuate one or more of the buttons on the tablet computer 100 via the actuator in a substantially remote manner. Accordingly, in embodiments, the programmable button(s) do not need to directly contact the button(s) on the tablet computer 100 or be in direct alignment therewith to have direct actuation thereof. That is, in an embodiment, at least one programmable button is provided on a first axis for actuational movement along the first axis (e.g., along the axis in a linear fashion by pressing the button inwardly), and the corresponding button on the tablet computer 100 configured for actuation via at least one actuator is provided on a second axis for actuational movement along the second axis, but the first axis and second axis are different from each other. In an embodiment, the location of the programmable button(s) on the smartcase 102 is different than the locations of the button(s) of the tablet computer 100. For example, the programmable button(s) may be provided on one side or surface, while the button(s) to be actuated on the tablet computer 100 are provided on another side or surface. The actuator(s) can be utilized individually or as part of an actuating system.

In accordance with an embodiment, the programmable button can be configured to implement its specified function (and/or other functions) based upon any number of initiation sequences, e.g., single push, double push, push and hold for a predetermined amount of time (e.g., thirty seconds), push and hold while pushing another button concurrently (e.g., power button or volume up/down key(s)). For example, the assigned sequence(s) can initiate a hard overall system reset, can run a system diagnostic and report results to end user, launch a specific software application or program, and/or launch combination software/hardware application (e.g., scan barcode, print, transmit data over WWAN).

Implementation of functions or actions by the accessory caps or by buttons such as a programmable button can be controlled by the circuit board 50/controller in the tablet carrier 10. The tablet carrier 10 includes embedded software to control the system architecture, including a USB bus, as well as power management (e.g., battery usage), peripheral interfaces and authentication associated with an accessory cap, and the microprocessor/controller, for example. A solenoid driver can be used as an actuator to electromechanically activate the power and/or volume button(s) on the tablet computer 100, for example. The tablet computer 100 is configured to communicate with hub of the circuit board 50 provided in tablet carrier 10.

The controller 50 may control the LEDs of the smartcase 102 via I2C communication with an LED driver. The buttons on the smartcase 102 (e.g., on/off, volume, programmable button(s)) communicate with the controller 50 via GPIO, for example. A tablet on/off button actuator (or actuation system) is electromechanically in communication with the controller 50 as well (e.g., as previously described). Essentially, the controller 50 of the smartcase 102 talks to the OS and core API of the tablet computer 100 via the USB-host in the form of connector 52. The controller 50 may communicate with the selected tablet computer/handheld device and is operatively connected thereto so as to allow communication of power and data between the controller 50 and the selected tablet computer/handheld device.

The exterior housing 12 and accessory cap 19D of FIGS. 26A-26G illustrate one embodiment incorporating such features as LEDs, programmable buttons, and parts discussed above (including, e.g., controller 50/circuit board, storage, processor) and later below (e.g., environmental sensors for sensing environmental condition(s)). In an embodiment, programmable buttons 53 may be positioned on the exterior housing 12 such that they flank either side of the interface 61 and/or connector portion 52. In one embodiment, shown in FIG. 26A, programmable buttons 53 that are LED illuminated may be provided relatively on either side of the connector platform 62, such that, when the tablet carrier 10 and tablet computer 100 are connected and operatively communicated with the exterior housing 12, the buttons 53 are still accessible. For example, when the exterior housing 12 of FIG. 26A is assembled and attached or connected to tablet carrier 10 and/or tablet computer 100, the buttons 53 on the front of the plate 63 may be generally positioned beneath or below a bottom surface of the tablet carrier 10. FIGS. 26E and 26F also show examples of buttons 53A that may be provided on a side or other surface of the smartcase 102 or modular assembly. These buttons 53A may be programmable and/or include LED illumination. In addition, a number of LEDs 51 may be provided on the exterior housing 12 or accessory cap 19D to provide an indicator or message to the user, e.g., an indication of the state of battery charge. A button 54 to activate and/or light the LEDs 51 may also be included (e.g., the button may be pressed to indicate the state of battery charge by lighting one or more of the LEDs 51). In an embodiment, a USB host mode switch 57 may be provided on the exterior housing 12 and/or accessory cap 19D. Such a switch 57 may indicate—e.g., via different color lights or LEDs—the host computer (tablet computer 100, or a cable-connected PC computer). The external housing 12 and/or accessory cap 19 may further include a wire charging and data communication port 67, as represented in FIG. 26D.

In an embodiment, the accessory cap 19D is attached to or incorporated with the exterior housing 12, and they are connected to the tablet carrier 10 using a commercially-available mechanical interface. The housing 12+cap 19D combination may include a functional device in communication with the tablet computer 100/handheld device by means of a modular communications interface which can accommodate, for example, iOS, Android, or Windows mobile devices (via such interfaces as Lightning connectors, USB Type B, USB Type C, and other standard electrical/data communications interfaces). Such an interface may be used to establish communication between the controller and tablet computer.

Although particular peripherals are labeled in the illustrations, e.g., barcode reader 23, other devices, including payment modules (wireless or chip payment) EMV readers, barcode scanner, and/or other devices described in this disclosure may be provided on the exterior housing 12 and/or accessory cap 19D.

Of course, it should be understood that, even though each of the previously described features noted with reference to FIGS. 2-6 may not be repeated above in the description related to FIGS. 26A-26G, the illustrated exterior housing 12 and/or accessory cap 19D may include any number or combination of such features. Further, the features described below may be provided in any of the illustrated configurations already noted.

Any number of types of sensors may be used with the smartcase 102 and/or accessory cap 19. Sensors 26, 27, and 28, schematically shown in FIG. 16, are illustrated in the exterior housing 12 of the smartcase 102 for explanatory purposes only, but should not be limiting. As noted previously, in one embodiment, any of the herein described accessory caps 19 (19, 19A, 19B, etc.) may include electronics, circuits, controller(s), battery(ies), and one or more of such sensors therein. The smartcase 102 may include embedded sensors that are physically incorporated into the internal volume of the case, in accordance with an embodiment. The embedded sensors may be connected via a wired connection or a wireless connection; that is, the smartcase 102 may support may support one or more external sensors that are connected via one or more wires/cables (e.g., USB, Lightning, HDMI, serial, etc.), or one or more wireless sensors that are connected via a wireless communication protocol (e.g., ZigBee, Bluetooth, WiFi, etc.) (whether provided in the exterior housing 12 or an attached accessory cap 19). In another embodiment, the smartcase 102 may include external sensors that are connected to the case, e.g., connecting sensor(s) via a wire to the smartcase 102.

Further, the smartcase 102 and/or the accessory cap 19 (including, e.g., the embodiment depicted in FIG. 26A) may contain its own independent wireless communication capability thru use of such modems as LORA, 4G LTE, or RPMA or other communication devices (e.g., Bluetooth, GPS, LTE, WiFi functionality). The communication device(s) may be used to communicate sensed and/or acquired data via network 60 to a remote server 70, user, supervisor, etc., in accordance with one embodiment.

The smartcase 102 may be configured to provide power, e.g., via a battery 22 (or batteries) contained therein, to embedded sensors and external sensors that are connected via wire to the smartcase 102. The smartcase 102 may also or alternatively be configured to provide power to sensors that communicate wirelessly when these sensors are docked (physically attached to) with the smartcase (whether provided in the exterior housing 12 or an attached accessory cap 19). The smartcase 102 may be host device independent in that it does not rely on the battery power from the tablet computer 100, but rather, power can be selectively provided to one or more sensors by the battery source 22 within the smartcase 102 (e.g., within the exterior housing 12, in the accessory cap 19, or both). This allows sensor data to be continuously recorded regardless of the power state or health of the host device/tablet computer 100, and independently of the state of the tablet computer 100. For example, if the tablet computer 100 is off or out of power, the sensors may continue to collect and store data.

In an embodiment, the smartcase 102 implements various wired (I2C, SPI, RS-232, USB, etc.) and wireless (e.g., ZigBee, Bluetooth, WiFi, etc.) communication protocols in order to communicate with a broad range of sensors. Using the wired and/or wireless communication interfaces, the smartcase 102 provides sensor configuration and control including, but not limited to: setting of sensor sensitivity range (e.g., accelerometer sensitivity: +/−2 g or +/−8 g), data sampling frequency (measurement frequency), conditional data sampling rules (criteria based data sampling—e.g., time or state dependent), conditional power state rules (e.g., time dependent), data reporting frequency (frequency at which sensor reports data to the smartcase), and the like.

In accordance with an embodiment, the smartcase 102 provides persistent sensor data storage in non-volatile memory 24 or a storage device contained therein. This permits sensor data to be recorded and stored regardless of the power state or health of the host device/electronic device. The size of the memory component of the smartcase 102 is configurable and may be changed to meet the requirements of the use case. As previously noted, in one embodiment, the memory 24 or storage device may be provided in the exterior housing 12. In another embodiment, memory 24 may be provided in an accessory cap 19.

FIG. 16 shows an exemplary schematic embodiment wherein three sensors 26, 27, and 28 are incorporated in the exterior housing 12 of the smartcase 102. However, it should be noted that this illustration is not intended to be limiting, e.g., sensor(s) may be provided in the accessory cap 19. Any number of sensors, including one sensor, may be provided in the smartcase 102, e.g., in the exterior housing 12 and/or tablet carrier 10 and/or in the accessory cap 19. Further, the type of sensor used in the smartcase 102 is not intended to be limiting. For example, the smartcase 102 may include, but is not limited to, the inclusion of the following sensor types as one or more of sensors 26, 27, and/or 28:

Environmental Sensors—sensors designed to measure one or more of the following: acceleration via tri-axial measurements for sensing shock, vibration, and motion, rotation (gyroscope), temperature, humidity (alone or combined with temperature sensor), altimeter (atmospheric/barometric pressure), ambient light, magnetometer, air quality (e.g., airborne particulate counter), water quality (waterborne contaminant counter), gas (sensors designed to measure $NO_2$, CO, etc.), radiation, chemical (e.g., pesticides, combustion emissions, gas leaks, and chemical warfare agents, etc.), noise (microphone), and the like;

Image (Optical) Sensors—sensors designed to measure one or more of visible, infrared, and ultra-violet light;

Health Sensors—sensors designed to measure heart rate, pulse oximetry, etc.; and/or Multi-Purpose Sensors—sensors designed to measure force, position, orientation, liquid level, air/liquid flow rate.

Depending on the number and type of sensors included therein, the smartcase 102 itself—or, more specifically, its controller 50—may include algorithms for data reduction and event detection, in accordance with an embodiment. In another embodiment, illustrated in FIG. 17, some or all of the sensed data may be transferred from the smartcase 102 over a network and to a server, for calculation and event detection. The following are examples of types of sensors and the associated algorithms/determinations/calculations that may be implemented with the smartcase 102, either locally therein (e.g., using controller 50 or processor 32) or via remote communication (using server):

In one embodiment, one or more accelerometers are provided as a sensor(s) in the smartcase 102. The sensed or collected data may be used to identify shock events that may have resulted in damage to the smartcase 102 or tablet computer 100 by examining X, Y, and Z acceleration data obtained via the accelerometer, in one embodiment. In another embodiment, the X, Y, and Z acceleration data measured by the accelerometer is used to identify periods when the smartcase 102 is in motion. In another embodiment, the orientation of the smartcase 102 and/or tablet computer 100 may be determined based on examination of the gravity vector relative to the smartcase's X, Y, Z device coordinate system. In yet another embodiment, the X, Y, and Z acceleration data sensed by the accelerometer is examined to identify dynamic conditions which exceed defined thresholds. In yet another embodiment, the X, Y, and Z acceleration data sensed by the accelerometer is examined to automatically determine the current step in the workflow (e.g., detect distinct vibration patterns during different phases of vehicle operation—setup, pumping, teardown, etc.). For example, in the case that a user or worker is out in the field with the tablet and smartcase, data may be collected in real-time and calculations made and adjusted based on workflow and patterns detected by the smartcase. Subsequently, software associated with the smartcase may automatically estimate time to job completion, dynamically adjust a user's/worker's assignments/schedule, and notify scheduled customers of changes to the time of arrival of the worker/technician (if applicable). In yet another embodiment, the X, Y, and Z acceleration data sensed by the accelerometer is examined to determine slowest/fastest steps in the workflow for each team, i.e., a group of users or workers. Subsequently, each team member/user can be provided with training that is tailored to their specific area of weakness (operational analytics→workflow optimization). In yet another embodiment, the X, Y, and Z acceleration data sensed by the accelerometer is examined to automatically detect equipment misconfiguration via abnormal vibration patterns. In yet another embodiment, the X, Y, and Z acceleration data sensed by the accelerometer is examined to characterize vehicle operator performance by deriving braking, acceleration, speed, cornering, and lane change data. Subsequently, this data can be combined ambient traffic conditions to determine a user's/driver's safety score. In yet another embodiment, the X, Y, and Z acceleration data sensed by the accelerometer is examined to maximize tablet and/or smartcase lifetime by identifying workers that do not handle devices properly and coach them accordingly (e.g., frequently dropped devices). In yet another embodiment, the X, Y, and Z acceleration data sensed by the accelerometer is examined to minimize device & equipment downtime by developing a model that correlates shock events to device failure modes, such that proactive evaluation of the devices may be performed (e.g., remotely from the deployed device that is with the worker/user). Accordingly, the acceleration and/or sensed data may be used to reduce downtime of a smartcase (with the contained tablet computer) via proactive repair/replacement of devices/equipment. In yet another embodiment, the X, Y, and Z acceleration data sensed by the accelerometer is examined to enhance worker health and safety by identifying devices/workers that have experienced a fall and provide assistance as required.

It should be noted that one or more, or a combination of, or all of the above determinations may be made using data collected by the accelerometer(s). Further, such determinations may be combined with data and determinations of other sensors provided in the smartcase. Accordingly, the above examples and embodiments are not intended to be limiting.

In an embodiment, a gyroscope is provided as a sensor in the smartcase 102. The sensed or collected data may be used to determine angular acceleration, i.e., the rate at which the device is rotating, via examining X, Y, and Z rotational acceleration/rate data obtained via the gyroscope, in one embodiment. In another embodiment, the X, Y, and Z rotational acceleration/rate data measured by the gyroscope is used to determine the orientation of the device. In another embodiment, the X, Y, and Z rotational acceleration/rate data sensed by the gyroscope is used to identify dynamic conditions which exceed predefined thresholds (i.e., determining threshold exceedance).

It should be noted that one or more, or a combination of, or all of the above determinations may be made using data collected by the gyroscope. Further, such determinations may be combined with data and determinations of other sensors provided in the smartcase 102. Accordingly, the above examples and embodiments are not intended to be limiting. As an example, in one embodiment, dynamic signature detection may be performed by examining the X, Y, and Z acceleration data sensed by the accelerometer and/or X, Y, and Z rotational acceleration/rate data sensed by the gyroscope to identify dynamic conditions which are defined apriori. For example, a change in state of vehicle operation that results in a recognizable X, Y, and Z acceleration or rotation signature may be detected and reported (e.g., waste management truck lifting equipment engaged and under load). In another embodiment, the X, Y, and Z acceleration data sensed by the accelerometer and/or X, Y, and Z rotational acceleration/rate data sensed by the gyroscope are utilized to propagate an initial state vector (position, orientation, and rate of translation/rotation) over time to determine dead reckoning of the smartcase 102 and tablet computer 100.

In an embodiment, a temperature and humidity sensor is provided as a sensor in the smartcase 102. That is, one or more sensors may be utilized to determine temperature and humidity of the atmosphere in which the smartcase 102 is being used (i.e., ambient temperature and humidity). The sensed or measured temperature and humidity data may be combined to calculate a heat index, in one embodiment. In another embodiment, the temperature and humidity data sensed by the sensor(s) is examined to identify conditions that exceed predefined thresholds (i.e., threshold exceedance). In another embodiment, the sensed or measured temperature and humidity data is examined to maximize device lifetime by identifying workers that do not handle devices properly and coach them accordingly (e.g., workers that leave devices on a vehicle dashboard during the summer in the desert). In another embodiment, the sensed or measured temperature and humidity data is examined to minimize device and equipment downtime by developing a model that correlates environmental conditions to device and equipment failure modes. Subsequently, downtime can be reduced by the provisioning of spares and proactive repair. In another embodiment, the sensed or measured temperature and humidity data is examined to enhance worker health and safety by proactively managing worker health & safety (e.g., generating alerts when the heat index is above a safety threshold). In another embodiment, the sensed or measured temperature and humidity data is examined to ensure compliance with local health and safety regulations (e.g., notifying workers to limit/stop activity when the heat index is above a regulatory threshold). In another embodiment, the sensed or measured temperature and humidity data is examined to verify environment conditions are appropriate for the process underway by verify weather conditions are appropriate for the installation/repair activities (e.g., verify current temperature/humidity is appropriate for curing of an adhesive). In another embodiment, the sensed or measured temperature and humidity data is examined to correlate worker productivity with environmental conditions by developing a model that correlates task duration versus environmental conditions. Subsequently, worker assignments can be dynamically rebalanced or redistributed based upon current environmental conditions (operational analytics→workflow/schedule optimization).

Again, one or more, or a combination of, or all of the above determinations may be made using data collected by the temperature and humidity sensor(s). Further, such determinations may be combined with data and determinations of other sensors provided in the smartcase 102. Accordingly, the above examples and embodiments are not intended to be limiting.

In an embodiment, a barometer is provided as a sensor in the smartcase 102. In one embodiment, the data measured by the barometer, e.g., the ambient air pressure—is examined to determine the altitude of the device. In another embodiment, the ambient air pressure is examined to identify conditions which exceed defined thresholds. In another embodiment, the sensed or measured barometric pressure is examined to automatic detect the current step in a technician's workflow (e.g., use altimeter to determine that technician is now at the top of the tower). Subsequently, historic data to automatically estimate time to job completion, dynamically adjust schedule, and notify subsequent customers of delays.

One or more, or a combination of, or all of the above determinations may be made using data collected by the barometer. Further, such determinations may be combined with data and determinations of other sensors provided in the smartcase 102.

In one embodiment, the smartcase 102 includes an accelerometer, a temperature/humidity sensor and a barometer as sensors 26, 27, and 28 and is independently powered via a battery 22 (e.g., provided in the accessory cap 19) and designed to store the collected sensor data in non-volatile memory 24. In place of, or in addition to barometer, an altimeter may be provided as one of the sensors in the smartcase 102. Accordingly, the above examples and embodiments are not intended to be limiting.

For example, one or more combinations of sensors may be provided and designed to complement one another and serve to detect critical data related to specific operational events. In one embodiment, the combination of sensors may be provided in the smartcase 102. In another embodiment, the combination of sensors may be provided in the exterior housing 12. In yet another embodiment, the combination of sensors may be provided in the accessory cap 19. Still yet, the combination of sensors may be provided in part of the smartcase 102 and in the accessory cap 19. In one embodiment, the combination of sensors may be provided in the exterior housing 12 and accessory cap 19.

One example of a combinational use of sensor packages includes having both Low G and High G sensor package/accelerometers to detect motion and then segment detected data with tuned discrimination to capture both impacts and low-level vibrational movement (i.e., separate shock vs. vibrational data). Another example may be detecting free fall incidents to estimate drop height, vibrational pattern data to garner real-time operation information, orientation and handling dynamics of the tablet computer 100/enclosed device to identify potentially dangerous conditions (e.g., including use while driving or moving, resulting in distracted driver behavior), use of various detected state conditions to disengage specific functions, buttons, or applications (e.g., for safety reasons, like distracted driving).

In one embodiment, the combination of sensors (e.g., sensors 26-28) provided in the smartcase 102 (and/or exterior housing 12 and/or associated with accessory cap 19) include: temperature, humidity, and barometric pressure sensors, accelerometers for detecting shock and vibration, an IMU (or GPS) for tracking location data, and a magnetometer. The combination may be used to maximize device and battery lifetime, minimize device and equipment downtime, enhance worker health and safety, and optimize workflow. In addition, the sensing of environmental conditions by the sensor(s) may assist in verifying that the working environment is acceptable (immediate or atmospheric/weather conditions) and/or may assist is increasing worker productivity.

An interface through which sensor data can be retrieved by the tablet computer 100 is further provided. In one embodiment, the tablet computer 100 includes its operating system (OS) and core application programming interface (or API) which can communicate via circuit board 50. The core application programming interface (API) specifies how the software components should interact with each other. The tablet computer 100 may have the ability to add and/or customize software application(s) tailored to specific use cases. The controller 50 of the smartcase 102 allows for downloading of new software as well, and, per its connection, software associated with one or more of the accessory caps 19 can be transferred into the hub and controller 50 of the smartcase 102. In accordance with an embodiment, the sensor data (raw, processed, and/or calibrated) collected by the sensor(s) 26, 27, and/or 28 in the smartcase 102 as well as algorithmically derived event data is available for use by mobile applications (e.g., developed by the host of the server or by a third party) and executed on the host device (i.e., tablet computer 100—tablet, phablet, or smartphone) via APIs. In one embodiment, the mobile application may permit device users to select and view sensor data in tabular or graphical format on the display screen 101 of the tablet computer 100. In another embodiment, the sensor data is presented in tabular or graphical format on a display screen of a device operated by a third party end user.

The algorithms used to assess features relating to the smartcase and/or tablet computer 100 with regards to shock, temperature, and humidity, for example (and thus damage thereto and/or amount and conditions of use) may be established by performing a number of tests before deployment of the smartcase.

As previously noted, in addition or alternative to implementing algorithms in the smartcase 102 using the sensed data, the sensed data may be transferred via network 60 to a remote server 70, in accordance with one embodiment. The server 70 may be a cloud server, for example. The server 70 may be a third party host, in accordance with an embodiment, or hosted by the provider of the smartcase 102. As shown in FIG. 17, the server 70 includes an operating system 72, processor 74 (or controller), and memory 76. One or more engines 78, 80 may be associated with server 70. The server 70 is not limited by brand, design, size, or operating system.

The server 70 is used for the aggregation of sensor data (e.g., environmental data) collected by the sensors 26, 27, and/or 28 in the smartcase 102 as well as to provide a means of centralized administration of groups of smartcases. For example, the controller 50 and/or communication devices of the smartcase 102 may transfer via network 60 sensed data to the memory 76 of the server 70 for processing by the processor 74. The server 70 may provide sensor data reduction, analysis, and visualization across populations/groups of smartcases 102 that are deployed in the field, for example, so that a third party end user and/or authorized party can monitor the status of the tablet computer 100 and/or smartcase 102. In some cases, the user or authorized party may respond and/or provide commands to the server 70. The server can also be used to configure accessory caps 19, sensor use, and application of the peripheral accessory within accessory caps 19, as well as to monitor a lifecycle of the smartcase 102 and/or tablet computer 100.

In an embodiment, the sensor(s) (26-28) included in the smartcase 102, exterior housing 12, and/or accessory cap 19 are configured to capture data in real-time, continually gathering and analyzing data, and communicating via network 60 to the cloud server 70 (or remote server) for support services, such as those mentioned above (monitoring, enabling parts, etc.), in order to maximize the end user's experience (e.g., uptime, available programs and feedback capabilities, environmental considerations, etc.).

Figure 18:
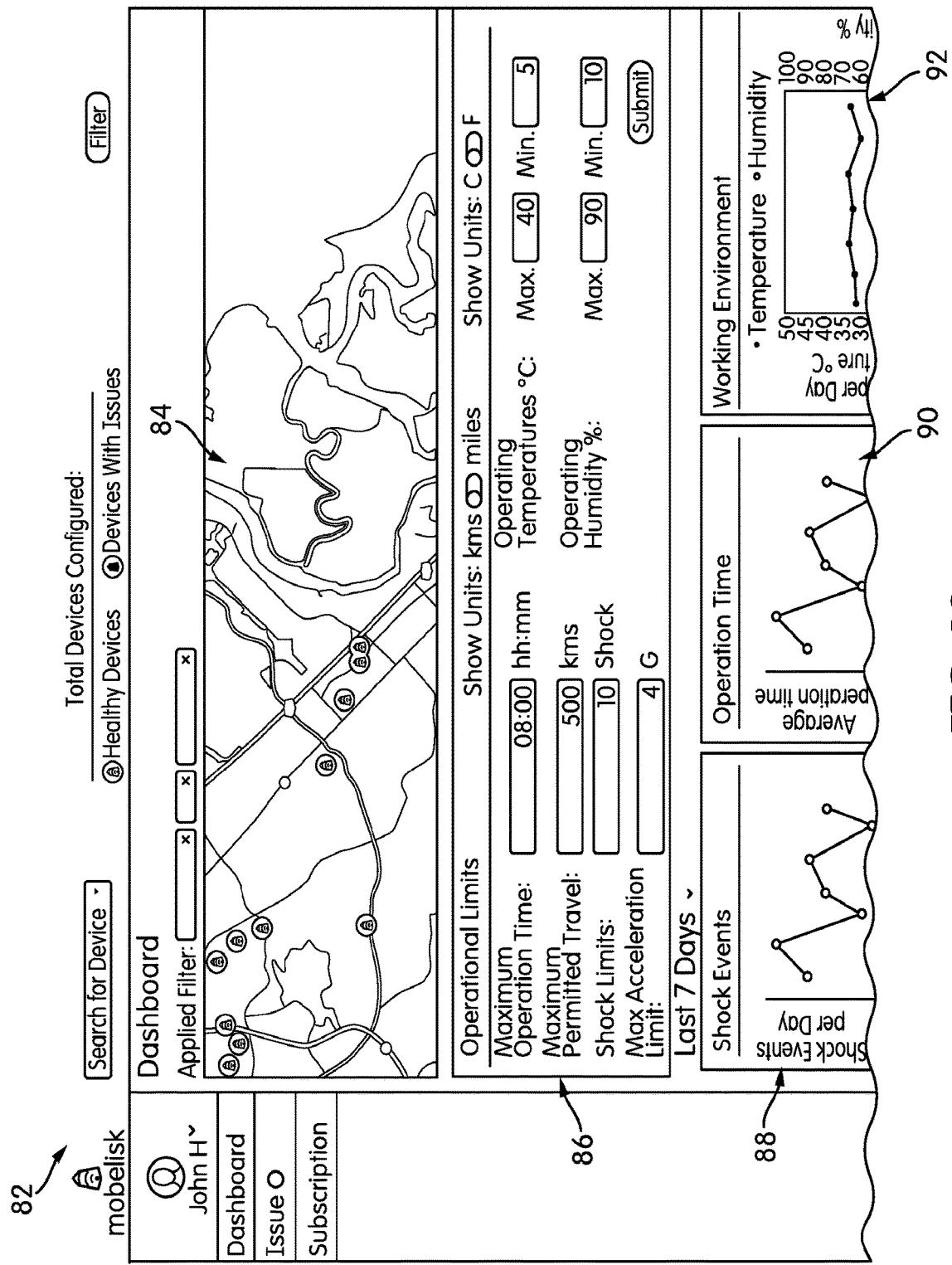
FIGS. 18 and 19 are example screenshots of a dashboard associated with the data collected and determined using the smartcase in accordance with an embodiment.
Figure 19:
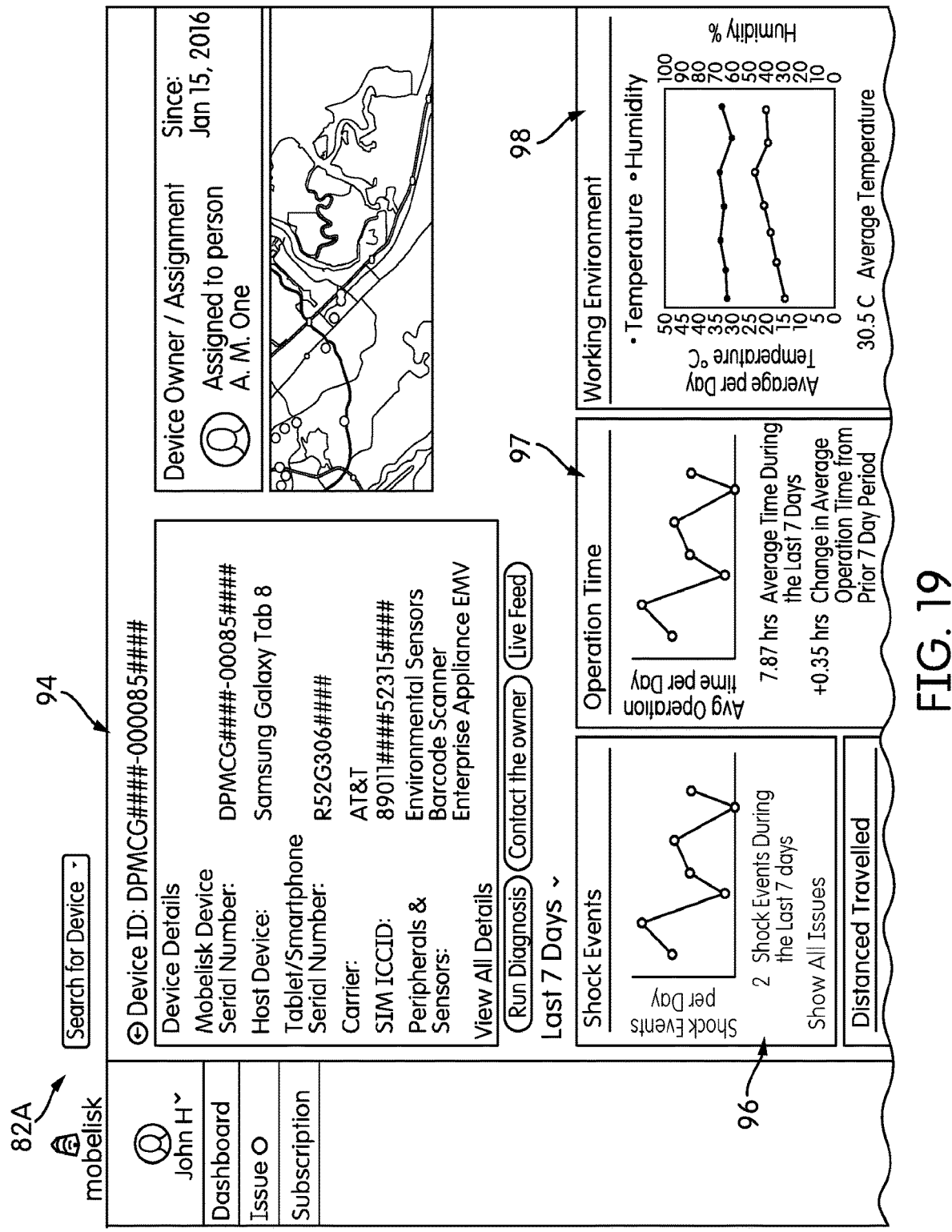
Figure 20A:
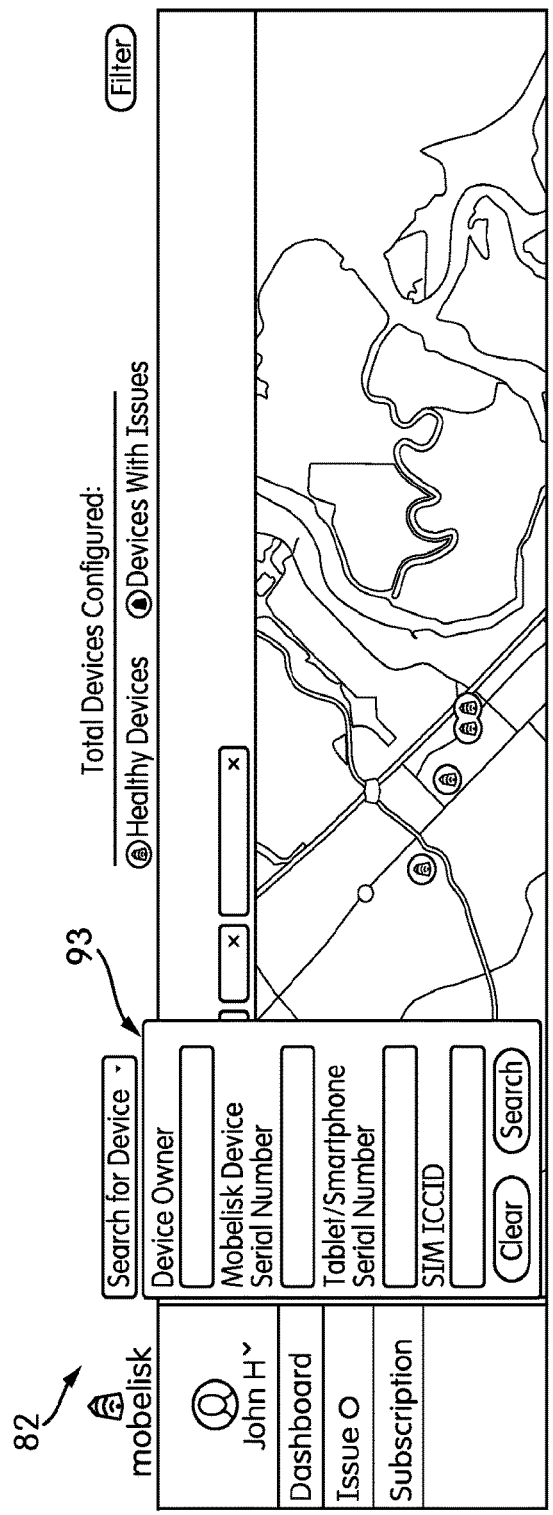
Figure 20B:
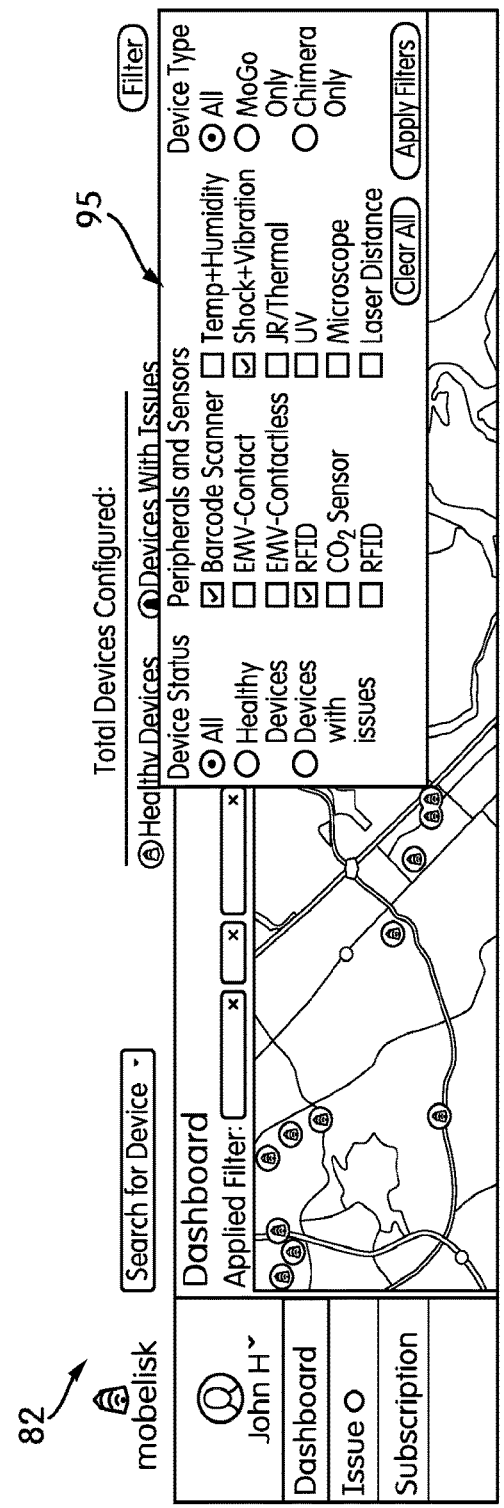

In an embodiment, the third party can access the (cloud) server 70 and the data analysis may be provided to the third party end user via a website (e.g., using a personal computer, tablet, etc.) or dashboard. FIGS. 18 and 19 are example screenshots of a dashboard 82 showing the sensed data and determinations made based on the same (e.g., using the smartcase 102 or server 70), in accordance with an embodiment. The dashboard 82 can be customized, themed, and/or branded to reflect branding of specific clients and end users. The dashboards presented may be customized or characterized by the exterior housing 12, peripherals and/or accessory caps 19 used in the smartcase 102 (e.g., sensor specific analytics, visualization, charts, reports, etc.) For example, in the non-limiting illustrated embodiment of FIG. 17, the dashboard 82 is designed to show data relating to a number or a group of smartcases 102 with tablet computers 100 that are deployed in the field and in use. The multiple smartcases 102 are each configured in real-time to relay their sensed data and environmental information to the cloud server 70 via network 60, such that it can be analyzed and presented to a user accessing the dashboards or system. Dashboard 82 includes GPS data module showing locations of each smartcase 102 in the group at 84, an operations limits module at 86 (see FIG. 22 for detailed view) for setting operational limits of the smartcase 102, a shock events module of the collection or group of smartcases that have taken place at 88 for displaying a number of shock events, an operation time module at 90 for logging times and periods the smartcase 102 and/or tablet computer 100 is operated, and the temperature and humidity of the working environment over a period of time at 92 (see FIG. 24 for an exemplary detailed view of this module). Data may be obtained by the GPS, IMU, and/or other sensors provided in the smartcase 102. The data displayed on dashboard 82 is not intended to be limiting. FIG. 20B shows, for example, that dashboard 82 may also include a menu for selecting features to display on the dashboard 82, including those related to individual smartcases 102 as well as the group of smartcases 102.

Dashboard 82A, shown in FIG. 19, is a device-specific dashboard for a selected one of the group of smartcases 102. For example, as shown in FIG. 20A, the dashboard 82 may include a drop-down menu 93 for selecting a particular device. Once a particular device is selected, those device details may be shown on dashboard 82A (FIG. 19). For example, a shock events module 96, operation time module 97, and working environment (temperature, humidity) module 98 showing data for the particular device may be presented to the third party end user. Again, it is noted that the data displayed on dashboard 82A is not intended to be limiting, and may be customized via drop-down menus and the like. Generally, such features are understood by one of ordinary skill in the art and thus are not explained in detail herein.

In an additional embodiment, data used to populate dashboards, such as those depicted in FIGS. 18, 19, 21-24 for example, is available to be accessed via industry-standard API's (application programming interfaces) such that it can be retrieved, analyzed, and displayed or visualized by third party applications (e.g. dashboards, control panels, and data analytics/software solutions). Further, in some embodiments, responses, commands, and/or alterations to data and/or the user may be communicated via APIs (e.g., by an administrator or other remote user).

In one embodiment, the smartcase 102 is configured to live-stream sensor data to the server 70 in real-time (e.g., provide the administrator with real-time data on the temperature or acceleration currently being experienced by the smartcase). FIG. 21 shows an example of a live-stream display of sensed data on a dashboard 82A for a particular device.

In an embodiment, the user/administrator may set up subscriptions, periodic data collection, alerts, etc. to display or show data periodically.

The server 70 allows a third party end user or administrator to define sensor configuration policies and then push these policies to specified smartcase and/or groups of smartcases via network 60 to the smartcase 102. Example sensor configuration settings, include, but are not limited to: setting of sensor sensitivity range (e.g., accelerometer sensitivity: +/−2 g or +/−8 g), data sampling frequency (measurement frequency), conditional data sampling rules (criteria based data sampling—e.g., time or state dependent), conditional power state rules (e.g., time dependent), and data reporting frequency (frequency at which sensor reports data to the smartcase 102). The server 70 may also allow an administrator to define sensor limit and threshold policies and then push these policies to specified smartcase and/or group(s) of smartcases. Example sensor limits and thresholds, include, but are not limited to: generating an event notification/alert when any of the following conditions are met: measured parameter is equal to, above, or below a specified value, measured parameter is equal to, above, or below a specified value on a specified number of occasions, and/or measured parameter is equal to, above, or below a specified value for a minimum period of time.

In accordance with an embodiment, a server API is provided which allows authorized [third] parties to retrieve sensor data from the host server 70. In an embodiment, a text-based messaging interface for interacting with the features associated with the smartcase 102 is provided. The interface may be obtained via application database, for example. The application can configure the smartcase 102, change settings, and request data by sending messages through the interface to feature modules within the system. Conditions and data are reporting by sending response message from the modules back to the application through this interface. In another embodiment, as noted above, a third-party API may be used by an authorized party, authorized third-party, authorized device, and/or user (e.g., administrator) to retrieve data from the server 70, e.g., displaying the data on one or more dashboards, or the raw data itself. A third party may use any number of types of software interfaces that allow receipt of requests and/or responses to request, receive, and communicate with the server 70; e.g., to request and provide/display the collected and sensed data (and/or the calculations, features, etc. associated with the data (sensed or detected from the environmental sensor(s) and/or peripheral(s)). Authorized parties include, but are not limited to third parties, consoles, devices, sources, servers, and individual users, and the like, that are authorized and/or given access to said software applications, to receive data based on requests. In some cases, authorized parties may respond and/or communicate with the server 70; e.g., respond to said received data via issuing a command to the server, one or more particular users, and/or smartcases.

The server 70 may include a RFID component tracking and wear out prediction engine 78 that determines components subject to wear out using RFID tags. In an exemplary embodiment, prior to the performance of each job, inventory may be taken of the RFID tagged components using an RFID-reader enabled smartcase. Utilization metrics for a job may be captured and reported to the server 70. The server 70 may calculate the aggregate utilization of each component and identify when a component is approaching its wear out (replacement) threshold. The server 70 may generate alerts and notifications accordingly. The server 70 may also automate ordering of replacement parts to ensure replacement parts are available (business continuity). The server 70 may increase operator safety by replacing key components prior to failure and possible human injury (e.g., replacing components before they fail while in use). The RFID tracking feature allows operators to ensure that all high value components are in their possession before arriving at as well as departing from job sites.

The server 70 may include a business continuity and end user behavior modification engine 80 that is capable of identifying smartcase(s) that fall outside of a predetermined condition, e.g., the mean by a specified number of standard deviations from the mean (e.g., users that drop their device most frequently) and/or a deviance relating to the predetermined condition. In accordance with an embodiment, in response to (i) the detection of a smartcase sensor limit/threshold exceedance condition or (ii) the presence of a particular smartcase in a group of devices a specified sigma value away from the mean, the business continuity and end user behavior modification engine 80 can be configured to generate and send audible and/or visual alerts and notifications to end users. The alerts and notifications may be presented to a user in a number of ways, including, but not limited to, illuminating a color LED in a particular color, sounding an alarm or sound producing device (e.g., through a speaker), visually displaying a notice on the display screen of the host device, and the like.

In an embodiment, the controller 50 of the smartcase 102 is configured to enforce a rights-management policy that limits access to sensor data to authorized parties. Rights can be assigned to specified sensors, data reduction algorithms, event types, time periods, etc.

In accordance with an embodiment, the smartcase 102 is configured to transfer sensor data to a host server or third party server, such as server 70, via network 60, for persistent storage and/or further data analysis/reduction (e.g., to examine the aggregate data across a group of smartcases). The smartcase 102 may leverage the wired and wireless data transfer services of the host device (WiFi, cellular data, etc.) to transfer sensor and other smartcase data to the server 70.

Further, the sensors provided in the smartcase 102 (tablet carrier 10, and/or exterior housing 12) and/or accessory cap 19 may include an inertial measurement unit (IMU) (i.e., a unit including accelerometer(s) and gyroscope(s)) and/or a magnetometer. The IMU and/or magnetometer may be integrated into the battery pack, for example. In an embodiment, data from an inertial measurement unit (IMU) and/or a magnetometer in the smartcase (acceleration, velocity, position, angular acceleration, angular velocity, and/or orientation data) is made available to a software application executing on the tablet computer 100.

For example, in accordance with one embodiment, the software application executing on the tablet computer 100 conditionally combines the smartcase provided motion and position information (e.g., obtained via sensor(s) and/or peripherals) with position and velocity information made available by the tablet's operating system and/or other applications executing on the tablet computer 100 in order to estimate the speed of the vehicle in which the smartcase is traveling. When the software application executing on the tablet computer 100 determines that the speed of the vehicle is above a defined speed threshold for a specified amount of time (e.g., speed is over 20 miles/hour for 10 seconds), the application executing on the tablet computer 100 may contact a mobile device management server to request that an application blacklist be applied to the tablet computer 100. In one embodiment, in response to the request, the mobile device management server changes the application policy associated with the tablet computer 100, causes a revised application policy to be transmitted to and/or download by the tablet computer 100, and causes one or more applications resident on the tablet computer 100 to be inoperable/inaccessible by the user (e.g., phone, messaging, and web browser apps). When the application executing on the tablet determines that the speed of the vehicle is below a defined speed threshold for a specified amount of time (e.g., speed is under 10 miles/hour for 120 seconds), the application executing on the device may contact a mobile device management server to request that a mobile application whitelist be applied to the tablet computer 100. In response to the request, in accordance with an embodiment, the mobile device management server changes the application policy associated with the tablet computer 100, causes a revised application policy to be transmitted to and/or download by the tablet computer 100, and causes one or more applications resident on the tablet computer 100 to be operable/accessible by the user (e.g., phone, messaging, and web browser apps).

The examples noted above are not intended to be limiting. In addition, although the implementations regarding the software applications are described above with reference to a mobile device management server, such a server is not required. For example, the operating system of the tablet computer 100 and/or the features provided in the smartcase 102 (e.g., exterior housing 12) and/or accessory cap 19 may be configured and capable of changing application policies directly, without communication with an MDM server or remote device.

In accordance with an embodiment, the smartcase 102 includes at least one battery, an IMU+environmental sensors, and one or more programmable buttons. The IMU, sensors, and buttons may be included in or on the exterior housing 12, and/or associated accessory cap 19, for example, in accordance with an embodiment.

Also, the controller 50 of the smartcase 102 may be configured to execute self-tests and/or adjust or mitigate functionality in response to a detected event (e.g., a shock event that exceeded a specified acceleration threshold).

Detected events, self-test results, or mitigation processes may be queued for transfer to the server 70 via the network 60.

In an embodiment, the smartcase 102 includes embedded software for Mobile Device Management (MDM) in order to detect, monitor, and control specific systems, such as: determining if an accessory cap 19 presented, authenticated, and when last attached/installed; battery capacity and status of battery(ies) in exterior housing 12 and/or a power booster accessory cap portion (if attached); determining accessory cap function (e.g., diagnostic to determine if the accessory cap is functioning properly); determining MSR accessory cap payment key present (and type); suspending or shutting down an accessory cap portion; and configuring locking of the tablet computer if an accessory cap portion is removed and/or tampered with. Such examples, however, are not limiting.

Figure 25:
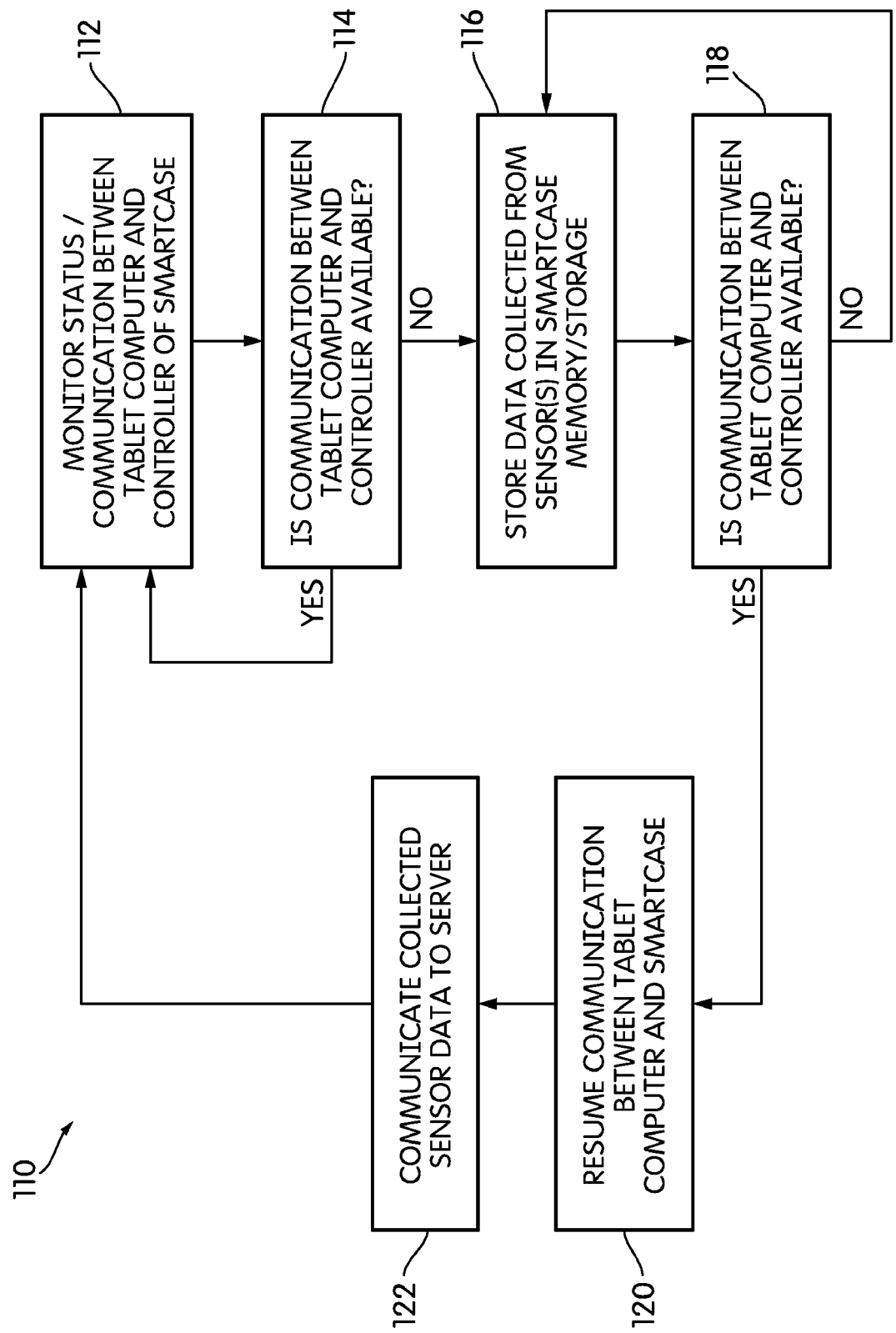
FIG. 25 is a flow chart showing a method implemented by the smartcase in accordance with an embodiment.

FIG. 25 shows a flow chart illustrating a method 110 for automatically monitoring the status of the tablet computer and controlling the storage and transfer of sensed data. In the exemplary embodiment shown in FIG. 25, the sensed data is stored when the tablet computer enclosed within the tablet carrier 10/smartcase 102 is unavailable, for example, when the tablet computer 100 is off or unavailable (e.g., off network). For example, if the tablet computer 100 has powered down, been deactivated (e.g., locally or remotely), is offline, has lost battery power, or if communication between the smartcase 102 and tablet computer 100 cannot be established, the data sensed by the sensor(s) may still be collected via smartcase 102, and communicated or transferred, e.g., to server 70, when tablet computer 100 is online. The method 110 can be implemented, e.g., using the software and firmware associated with the smartcase 102, for example.

Still, it should be understood by the description above that the method 110 is further designed, in some embodiments, to store sensed data in any number of instances—including when the tablet computer 100 is operational—yet independently of the state of the tablet computer 100.

Generally, the method 110 includes: automatically monitoring a status of the tablet computer 100 and communication between the tablet computer 100 and smartcase 102, shown at 112. Periodically, a determination is made at 114 if a tablet computer is available, e.g., is communication between the tablet computer 100 and smartcase 102 maintained, or can it be established. If YES, the monitoring at 112 continues. If NO, then data collected from the sensor(s) of the smartcase 102 is stored in the memory/storage 24 of the smartcase 102, shown at 116. The smartcase 102 will continue to determine if the tablet computer 100 becomes available, as noted at 118. If NO, the storage of sensed data continues in memory/storage 24. If YES, then communication is resumed between the tablet computer 100 and the smartcase 102 at 120. Thereafter, the collected and stored sensor data in memory/storage 24 is transferred or communicated, e.g., to server 70, for assessment.

In accordance with an embodiment, data transfer of the collected/stored sensor data may also or alternatively be restricted based upon the wireless connectivity status/type. For example, a policy can be defined that only permits large data sets to be transferred via WiFi to reduce cellular data transfer and related costs.

The method 110 allows for continued collection and monitoring of environmental data around the tablet computer 100 and smartcase 102. No manual intervention is required to change the storage location of the sensed data. The method 110 may be implemented by the controller 50 of the smartcase 102, for example. Further, a third party end user or administrator can utilize the sensed data to manage/reduce service and support costs for mobile deployments of one or a group of smartcases 102.

The smartcase 102 disclosed herein provides both a physical protection device for a computing device like tablet computer 100 and monitoring of environmental conditions and events that the devices are subjected to, so that they can be proactively managed from a service and support standpoint, to minimize downtime (or maximize uptime) of the smartcase 102 and tablet computer 100 and minimize costs. By selectively and actively monitoring key environmental data—such as shock, vibration, temperature, heat index, and humidity, for example—that which the tablet computer 100 is subjected to, and then applying that information in relation to the performance capabilities of the device, particularly those which are known to cause potential failures, allows for a fleet or group of smartcases to be managed for optimal field performance. It further allows for a quicker response to service/support problems in the field and—in some cases—even obviate problems before they actually occur, i.e., perform preventive maintenance.

Additionally, the sensed data may be used to identify and characterize patterns (like shock and vibrational data) in order to reach conclusions on how the device is being used in the field, so that pre-emptive/corrective actions may be taken, as necessary.

In an embodiment, an alert may be optionally provided via smartcase 102 to alert a user that communication with the tablet computer 100 is unavailable. In an embodiment, the alert at 120 is provided by turning on, or changing color of the LEDs on the buttons of the smartcase 102. The number of LEDs that are lit may also be adjusted, or, alternatively, the LEDs may be configured to flash. Of course other alerts, such as an alarm (visual or audible) on the tablet computer 100 and/or on the smartcase 102 may also be used. The optional alert may be provided in any number of forms and is not intended to be limiting.

Accordingly, the method 110 as shown in FIG. 25 illustrates how the charging and power management of the smartcase 102 may reside in the software and how it is managed automatically), without human intervention or human interaction to control the sensed data (e.g., it does not require activation of a push button to start storage). The smartcase 102 continuously and/or constantly receives information on the state of communication with the tablet computer 100 and the accessory cap(s).

In addition to monitoring and reporting the communication status of both the modular assembly and tablet without the need for user interaction or implementation, the software and/or firmware may be configured to also perform diagnostics on subsystems within the modular assembly 102 and may report such determinations or finding to an end user.

Also, in an embodiment, a software development kit (SDK) may be provided for use in conjunction with the modular assembly 102 to allow for the capability of embedding the functionality (or functionalities) of the exterior housing 12 or an accessory cap 19 into a selected software application to control the sensors and functional peripherals within the smartcase. The SDK enables applications running on different types of tablet computers to interact with the exterior housing 12 or accessory cap 19 via the controller board/controller.

Further, third party applications may be configured and integrated for use with the smartcase 102. Mobile payment/processing applications, CRM applications, mapping/intelligent routing applications, barcode scanning applications, device geo-tracking applications, hosted content management and delivery applications, general image capture/upload applications, and other applications as currently known or developed later, can be designed, tested and deployed by third party application developer community and implemented in the smartcase 102.

In accordance with an embodiment, part of the enclosure of the smartcase 102 can be disassembled and still function. In an embodiment, in an event that there is no accessory cap 19 (i.e., all caps removed from the exterior housing 12), the design of the tablet carrier 10 and exterior housing 12 still permits operation of the tablet computer 100. Thus, the design may include a singular functional accessory cap, or none at all. In another embodiment, with accessory cap 19 removed, one or more programmable buttons (e.g., as described above) provided on the tablet carrier 10 and/or exterior housing 12 and are configured for use to automatically actuate or implement a tablet associated function (e.g., open an application or a program).

Moreover, in accordance with an embodiment, the accessory cap 19 may provide its functionalities when connected together with the exterior housing 12 and/or independently of the exterior housing 12 (i.e., it does not require connection to the exterior housing 12 to function or collect data). The accessory cap 19 may function to perform its data collection via sensor(s) (26-28) and/or its peripheral functional device based on its own power source (e.g., a battery contained therein). Such data may be stored in a local memory, e.g., memory 24. In one embodiment, the accessory cap 19 may forward its collected data stored within its memory via a wired connection or wirelessly (e.g., via a cloud) to a server or a remote device without connection to the exterior housing 12. In one embodiment, when connected to the exterior housing 12 (e.g., via connector 55), the accessory cap 19 may communicate with the tablet computer 100 (e.g., via connector 52 connecting the exterior housing 12 to the tablet computer 100) to send data (saved in memory 24) to the tablet computer 100 and/or the server or a remote device.

In addition, because of the interchangeability of caps with the exterior housing 12, one or more caps may be periodically connected to the exterior housing 12 as part of the smartcase 102, such that different data points may be collected and/or transferred/communicated at different points in time. For example, a bar code reading accessory cap and a credit card accessory cap may be connected and disconnected from the exterior housing 12 throughout different parts of a work day in order to read, collect, store and optionally transfer gathered data. In addition, any sensor(s) contained within the accessory cap(s) can also be used to collect environmental data. By providing memory in accessory cap(s), for example, such data may be stored separately and independently from the memory in the tablet computer. The peripheral/functional data and/or the sensed data stored in the memory of the accessory cap may be transferred independently or when connected to the exterior housing 12, either directly upon connection, when communication is established, and/or at a designated time(s).

Accordingly, this disclosure provides a smartcase design that supports and extends customer media tablet computers and similar electronic devices by providing a range of customizable solutions that are durable and provide protection to the tablet computer. The smartcase can be flexibly configured and/or customized to provide a tailored solution with specific functions associated with its peripheral components (in the form of interchangeable accessory cap portions) that enclose, connect, and/or cooperate with a tablet and tablet carrier, in addition to providing decorative and protective features. It can further include customized software loading that can be implemented or accessed via programmable button(s). The assembly accommodates customer-interactive applications, consolidates features for specific uses, and provides a solution for complementary functionality to a range of different types of tablets (e.g., can be assembled with accessory cap(s) for a targeted use). The disclosed assembly is not limited by volume leverage, and provides flexibility to cover a variety of enterprise use cases.

In one embodiment, smartcase 102 includes exterior housing 12 and accessory cap 19, and the accessory cap 19 may include all electronics therein, e.g., sensor(s), communication devices, batteries, battery charging circuits, etc. are provided in the accessory cap 19 that connects to the exterior housing 12, which is simply a "dumb" or "dummy" case with no such devices therein and simply provides support to the tablet computer 100. The accessory cap 19 may plug into a port on the tablet computer 100 or connect via an electrical contact.

In another embodiment, smartcase 102 includes exterior housing 12 and accessory cap 19, and the bulk of the sensors, communication devices, batteries, battery charging circuits, etc. are contained within the exterior housing 12 and the interchangeable accessory cap 19 just adds its functional device. A simple electrical contact may allow the functional device to communicate with the components in the exterior housing 12, for example.

In yet another embodiment, no accessory cap 19 is provided as part of smartcase 102. In this case, all of the components are in the exterior housing 12.

In one embodiment, the exterior housing may contain zero or more of each of the following components: functional devices (e.g., barcode scanner, card reader, imagers, etc.), at least one sensor (e.g., temperature, humidity, acceleration, etc.), volatile memory, non-volatile memory, microprocessors, non-illuminated programmable buttons, illuminated programmable buttons, batteries, battery charging subsystems (wired or wireless), and/and or a controller for communication the exchange of power and/or data with (i) the selected tablet computer and/or (ii) an interchangeable accessory cap, the at least one sensor, and the housing memory.

In another embodiment, the exterior housing may include at least one sensor, memory, at least two programmable buttons (potentially illuminated), and a controller for communication with both the selected tablet computer as well as one or more optional functional devices contained in an interchangeable accessory cap.

In one embodiment, the interchangeable accessory cap may contain one or more of each of the following components: functional devices (e.g., barcode scanner, card reader, etc.), sensor(s) (e.g., temperature, humidity, acceleration, etc.), volatile memory, non-volatile memory, microprocessors, non-illuminated programmable buttons, illuminated programmable buttons, batteries, battery charging subsystems (wired or wireless), and/or and a controller for the exchange of power and/or data with (i) the functional devices contained within the accessory cap, (ii) a controller contained in the exterior housing, and/or (iii) the tablet computer.

In another embodiment, the interchangeable accessory cap may include a controller for communication with both the functional devices contained within the accessory cap as well as the controller contained in the exterior housing, at least one battery, at least one battery charging subsystem (wired or wireless), at least one programmable button (potentially illuminated), and one or more optional functional devices in communication with the controller in the accessory cap.

In another embodiment, the interchangeable accessory cap 19 or the complete modular accessory/smartcase 102 (such as the device depicted in FIG. 26A) may—either independently or in conjunction with communications with the server 70 via the network 60 in FIG. 17—cause the electronic device or tablet computer 100 to change state in such a way to limit functionality and/or highlight/portray specific applications (regardless of O/S) depending upon specific workflows or operational policies desired.

In yet another embodiment, the external housing and the accessory cap may each include at least one sensor. In an embodiment, both sensors in the external housing and accessory cap may be designed to sense an environmental condition.

In an embodiment, the at least one sensor in the exterior housing/accessory cap is configured to sense an environmental condition. Sensor data gathered over a period of time may be algorithmically analyzed in order match the measured data to known patterns of data to identify specified events or environmental conditions. Raw or algorithmically processed sensor data is stored in the memory of the exterior housing and/or accessory cap.

In one embodiment, the at least one battery and the controller contained by the exterior housing may be operatively connected to the tablet computer so as to allow communication of power and data between the exterior housing controller, the tablet computer, the controller in the accessory cap, the battery in the accessory cap, and the functional device(s) of the accessory cap. The at least one sensor, the exterior housing controller, and the accessory cap controller may receive power from the battery in the accessory cap whenever power is available. The at least one sensor may be configured to sense an environmental condition and the sensed data may be stored within the housing memory of the exterior housing independent of the power or data communication state of the phablet/tablet computer.

In one embodiment, the tablet computer's battery is operatively connected to the accessory cap battery and conditionally receives power from the accessory cap battery. Charging algorithms determine when the accessory cap battery supplies power to the tablet computer's battery. In another embodiment, the tablet computer's battery is operatively connected to a battery within the exterior housing and conditionally receives power from the housing battery. Charging algorithms determine when the exterior housing battery supplies power to the tablet computer's battery.

The smartcase can be installed on tablet computer(s) and used in any number of markets, including, but not limited to, field services, hospitality, retail, financial services, medical, and transport industries. It can be built, made or manufactured, and mounted or assembled for connection with any number of existing tablet computers or customized tablet computers. Hence, from a manufacturing standpoint, the designer can use the same exterior housing 12 and the same caps with different carriers 10 and different types of tablet computers 100. This reduces the amount of custom tooling required, and allows the usage of a same or common external housing and types of caps to be allocated across systems or assemblies accommodating tablet computers 100 of differing types.

That is, because the carrier 10 is the structure that mechanically interfaces with the tablet computer 100, in terms of fitting closely for proper securement and also possibly in terms of providing access to the button(s) and/or port(s) on the tablet computer 100, it can be varied to accommodate different tablet computers 100 while the exterior housing 12 can remain the same. Thus, a high degree of flexibility and modularity may be achieved because a common exterior housing 12 can be used with different interposers/tablet carriers 10 to use on different types of tablet computers 100. Thus flexibility and modularity is further increased because the exterior housing 12 has the interface(s) for receiving caps of different types.

The smartcase 102 is a fully mobile device. It provides a mobile, consistent, OS-agnostic solution for deploying consumer media tablets and electronic devices with a variety of accessory caps (or peripherals) which may be targeted to specific business usage scenarios. The smartcase 102 may have ubiquitous data access, i.e., used indoors or outside without access to power or it may have geo-restricted data access, i.e., restricted to a network (e.g., LAN or via GPS). As previously noted, it further can be used in a stationary or docked configuration, with or without perpetual access to power and/or other connectable devices (e.g., to a screen).

Also, the smartcase 102 as disclosed herein may be designed to provide several features for use with tablet computers (and/or phablets and/or other types of electronic devices) which may include, but are not limited to: can increase (e.g., double) the battery capacity of media tablet; can protect the media tablet computer and corresponding accessory cap peripherals, can be water resistant, prevent ingress of water and/or dust into the tablet carrier and/or smartcase, to provide thermal shock absorption and withstand vibrations, withstand temperature differences and extremes, provide a non-slip grip or surface, allow for holding with one or both hands with minimal fatigue due to its curved design, and accessibility of key functions are not blocked by ports or cables. The smartcase 102 optimizes power distribution from the smartcase battery(ies) to ensure there is power available for the associated functions, LEDs, buttons, etc. in the accessory cap(s) 19 while still optionally allowing for charging of the tablet battery. The smartcase 102 can be provided in one or multiple colors, exterior finishes, and/or with or without branding options.

In an embodiment, parts of the tablet carrier and the exterior housing can be integrally formed or joined together. In an embodiment, parts of the exterior housing and accessory cap may be integrally formed or joined together, e.g., to form a single, integrated unit. The elements, features, and connection and separation of such elements, as shown in the Figures, are not limiting. In an embodiment, the exterior housing can be formed with internal surfaces that correspond to a selected type of tablet, while its outer or outside surfaces have a common or universal design. Additionally, the design and/or shape of the exterior housing 12 and/or accessory cap 19 is not intended to be limited to those illustrated. Generally, the housing 12 and cap 19 may be formed of shapes that are desirable aesthetically and ergonomically comfortable for a user.

The disclosed smartcase further increases battery life and is low cost. It can include both electronic and direct actuation of buttons on tablet computers. The accessibility of keys and their respective functions of a selected tablet computer are not blocked by ports or cables in this modular assembly, as the tablet carrier and/or external housing are formed to accommodate (e.g., via openings or buttons) such items of the selected tablet computer.

Furthermore, the smartcase 102 or modular assembly—which may include one or more interchangeable accessories in the form of accessory cap associated therewith—extends the versatility of tablet carriers and tablet computers (and phablets, and phones) via its architecture, features, and enterprise mobility applications. The buttons may be programmed to simply operation and feedback/communication with end users and remote devices/users. Use of interchangeable accessory caps with the smartcase 102 further allows the user to customize the peripherals and/or accessories desired or needed.

Moreover, the materials and specifications of the parts and modular assembly described herein are not intended to be limited. The smartcase batteries can be a swappable, of various capacity, and can be inductively charged by a power booster, for example.

Although not described in detail herein, it should be understood that the smartcase 102 can include other features. These include, but are not limited to, an adjustable handstrap, an additional battery, a pen holder or garage, audio outlets or output, ports, controls or buttons, indicators (e.g., LEDs), optional keypad, and optional mounting bracket. The functional devices used with the accessory cap(s) 19 can vary, as previously noted.

In an embodiment, one or more seals (e.g., gland seal, O-rings, membrane) are provided in tablet carrier 10 and/or exterior housing 12 for aiding in limiting ingress of moisture, water, or dust of/from an environment, for example, from entering the smartcase 102, interfering with parts contained therein, and limiting damage to parts (e.g., preventing damage to the tablet itself and the functional devices within the accessory cap(s)). For example, the assembly can be formed using plastic(s) that are sealed (via one or more seals) to meet Mil. Std. 810g and IP 54+. Also, for example, a material can be applied to vary the feel of the exterior surface of the exterior housing 12, e.g., non-slip or rubberized feel to metallic finish, and alternating colors can used on the exterior housing (e.g., primary and/or accent colors). Logos, symbols, and/or other branding can also be applied on the exterior housing 12. A hand strap can be applied to the exterior housing 12 (e.g., back of the smartcase 102), for example. The hand strap can include an adjustable strap that can be temporarily secured (by a device such as hook and loop material or a snap) and oriented to comfortably allow usage of the overall solution in both landscape and portrait orientations. An optionally lockable fixed mount bracket that fixes power input or docket for battery charging can also be provided. The optional lockable fixed mount bracket can provide the option of locking the tablet to the fixture, ensuring the power source maintains connection, and provide multiple interface options to stationary stands or fixtures.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, any reference to "first" and "second" should not be limiting. One of ordinary skill in the art understands that the use of first and second is not intended to limit the type, application, location, and/or use of the described features.

Moreover, in accordance with another embodiment, the accessory cap 19 need not provide a function or have functional (peripheral) device therein, and may merely be used as a part, case, or holder (for other devices) in the smartcase. For example, in one embodiment, an accessory cap 19 may be used as a storage device. The accessory cap may include a hollow portion therein to hold a cord, connector, earphones or earbuds, accessories, or other devices that may be used with the tablet computer and/or smartcase.

The end user and markets for utilizing the herein disclosed smartcase are many. For example, the smartcase may be used by any number of markets, including, but not limited to: Hospitality (waiters/Waitresses/Customer Service Reps), Retail (Sales/Customer Service Reps/Checkout Personnel/Craft Fair Exhibitors/Inventory/Merchandisers), Fleet Service/Logistics (Outbound Service Reps/Inspectors, trucking), Field Service (Inspectors/Technicians/Door to Door Sales, safety inspections, Utility/Energy services such as plumbing, AC services), Transportation (Airline Hosts/Agents, Public Transport Personnel, Delivery, Cab Service), Healthcare (Doctors/Nurses/Medical Technicians/Inventory), Warehouse/Distribution, Law Enforcement and/or Fire Department/EMT services, Military/Defense, Agricultural Operations, and General Prosumers and Mobile professionals.

Also, the articles "a" and "an" are used herein to refer to one or to more than one (i.e., to at least one) of the grammatical object of the article. Additionally, any reference to more than one item in the description (e.g., caps, devices, batteries, etc.) is not intended to be limited to the use of only more than one of such articles, but for descriptive and/or explanatory purposes only. It should be understood that singular articles may be used without departing from the scope of this disclosure.

The description set forth above in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter. Also, like features and devices use similar numerals (e.g., cap 19, 19A, 19B, etc.) and it should be understood that features described with reference to one device may be interchanged with another like device with similar number.

The exemplary sensor(s) and peripheral(s) described herein may be provided in either the exterior housing 12 or the accessory cap 19, or both, in accordance with embodiments herein.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" and the like in various places throughout the specification is not necessarily referring to the same embodiment. Further, the particular features, structures, embodiments, or characteristics may be combined in any suitable manner in one or more embodiments. Further, it is intended that embodiments of the disclosed subject matter cover modifications and variations thereof.

Also, reference to "in the smartcase 102" and the like should be understood to refer to either one or both of the tablet carrier 10 and exterior housing 12. In some instances, one or more of the herein described features may be provided in the exterior housing 12, accessory cap 19, or both.

It is to be understood that terms such as "left," "right," "top," "bottom," "front," "rear," "side," "length," "width," "upper," "lower," "interior," "exterior," "outer," and the like that may be used herein merely describe points of reference and do not necessarily limit embodiments of the present disclosure to any particular orientation or configuration. Furthermore, terms such as "first," "second," etc., merely identify one of a number of portions, components, steps, operations, functions, and/or points of reference as disclosed herein, and likewise do not necessarily limit embodiments of the present disclosure to any particular configuration or orientation.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A modular case assembly for a selected range of tablet computers, the modular assembly comprising:
   a tablet carrier for encasing a selected tablet computer selected from the range of tablet computers, the selected tablet computer having one or more ports, a tablet battery, a tablet memory, and an external button configuration;
   an exterior housing configured to connect to the tablet carrier, the exterior housing comprising at least one sensor, a housing memory, and a controller for communication with the selected tablet computer, the at least one sensor, and the housing memory;
   and
   at least one battery;
   wherein the at least one battery and the controller contained by the exterior housing are configured to be operatively connected to the tablet computer so as to allow communication of power and data between the controller and the tablet computer,
   wherein the at least one sensor is configured to sense an environmental condition and wherein the sensed data is stored within the housing memory of the exterior housing independently of a state of the selected tablet computer.

2. The assembly according to claim 1, further comprising an accessory cap configured to be attached to or incorporated with the exterior housing and including a functional device in communication with the controller along with the tablet computer.

3. The assembly according to claim 1, wherein the at least one sensor of the exterior housing is selected from the group consisting of: accelerometer, gyroscope, temperature sensor, humidity sensor, and barometer.

4. The assembly according to claim 2, wherein the accessory cap comprises at least one sensor therein, and wherein the at least one sensor is configured to sense an environmental condition different from the at least one sensor of the exterior housing, and wherein the sensed data of the at least one sensor of the accessory cap is stored within the housing memory of the exterior housing independently of a state of the selected tablet computer.

5. The assembly according to claim 1, wherein the exterior housing has an accelerometer and temperature sensor therein.

6. The assembly according to claim 1, wherein the tablet carrier and/or exterior housing comprises at least one programmable button for communicating with the controller of the exterior housing to implement a specified function.

7. The assembly according to claim 4, wherein the at least one programmable button is contains an LED.

8. The assembly according to claim 2, wherein the accessory cap is configured to be interchangeable with one or more replacement caps comprising different functional devices, wherein the one or more replacement caps is configured to communicate with the controller.

9. The assembly according to claim 8, wherein the one or more replacement caps are configured to be installed on the exterior housing.

10. The assembly according to claim 2, wherein the functional device of the accessory cap is selected from the group consisting of: a magnetic strip reader and/or writer, a smart card reader, a secure chip and pin access device, an RFID reader, a scanner, a battery, a power source, a camera, an image capture device, a geo-tracking device, serial DB9, laser distance, thermal/IR imager, UV imager scientific instrument, and CO2 sensor.

11. A modular case assembly for a selected range of tablet computers, the modular assembly comprising:
   a tablet carrier for encasing a selected tablet computer selected from the range of tablet computers, the selected tablet computer having one or more ports, a tablet battery, a tablet memory, and an external button configuration;
   an exterior housing configured to connect to the tablet carrier;
   an accessory cap configured to be attached to or incorporated with the exterior housing and including a functional device in communication with the controller along with the tablet computer, the accessory cap further comprising at least one sensor, a housing memory, and a controller for communication with the selected tablet computer, the at least one sensor, and the housing memory; and
   at least one battery;
   wherein the at least one battery and the controller contained by the accessory cap are configured to be operatively connected to the tablet computer so as to allow communication of power and data between the controller and the tablet computer,
   wherein the at least one sensor is configured to sense an environmental condition and wherein the sensed data is stored within the housing memory of the accessory cap independently of a state of the selected tablet computer.

12. The assembly according to claim 11, further comprising a connector configured to operatively connect the accessory cap and the tablet computer.

13. The assembly according to claim 11, wherein the at least one sensor of the accessory cap is selected from the group consisting of: accelerometer, gyroscope, temperature sensor, humidity sensor, and barometer.

14. The assembly according to claim 11, wherein the accessory cap has an accelerometer and temperature sensor therein.

15. The assembly according to claim 11, wherein the exterior housing has an accelerometer and temperature sensor therein.

16. The assembly according to claim 11, wherein the tablet carrier and/or exterior housing comprises at least one programmable button for communicating with the controller of the exterior housing to implement a specified function.

17. The assembly according to claim 16, wherein the at least one programmable button is contains an LED.

18. The assembly according to claim 11, wherein the accessory cap is configured to be interchangeable with one or more replacement caps comprising different functional devices as well as a battery and controller therein.

19. The assembly according to claim 18, wherein the one or more replacement caps is configured to be installed on the exterior housing.

20. The assembly according to claim 11, wherein the functional device of the accessory cap is selected from the group consisting of: a magnetic strip reader and/or writer, a smart card reader, a secure chip and pin access device, an RFID reader, a scanner, a battery, a power source, a camera, an image capture device, a geo-tracking device, serial DB9, laser distance, thermal/IR imager, UV imager scientific instrument, and CO2 sensor.

21. A method for automatically monitoring and storing environmental conditions of a tablet computer provided within a modular case assembly, the modular assembly comprising: a tablet carrier for encasing a selected tablet computer, the selected tablet computer having one or more ports, a tablet battery, a tablet memory, and an external button configuration, an exterior housing configured to connect to the tablet carrier at least one sensor, a housing memory, and a controller for communication with the selected tablet computer, the at least one sensor, and the housing memory, and at least one battery, wherein the at least one battery and the controller are configured to be operatively connected to the tablet computer so as to allow communication of power and data between the controller and the tablet computer, and wherein the at least one sensor is configured to sense an environmental condition; wherein the method comprises:
- automatically monitoring a status of the tablet computer and communication between the tablet computer and the controller;
- determining that communication between the tablet computer and the controller is unavailable;
- sensing data using the at least one sensor; and
- storing sensed data in the housing memory independently of a state of the tablet computer.

22. The method according to claim 21, further comprising:
- reestablishing communication between the tablet computer and the controller; and
- transferring stored sensed data in the housing memory to a remote server.

23. A modular case assembly for a selected range of tablet computers, the modular assembly comprising:
- an exterior housing configured to connect to a selected tablet computer encased in a tablet carrier, the selected tablet computer being selected from the range of tablet computers, the selected tablet computer having one or more ports, a tablet battery, a tablet memory, and an external button configuration,
- an accessory cap attached to or incorporated with the exterior housing and including a functional device in communication with the tablet computer;
- a controller for communication with the selected tablet computer and being operatively connected thereto so as to allow communication of power and data between the controller and the tablet computer;
- at least one sensor;
- a housing memory; and
- at least one battery;
- wherein either the exterior housing or the accessory cap, or both, contain the at least one battery and/or the controller,
- wherein the at least one sensor is configured to sense an environmental condition and wherein the sensed data is stored within the housing memory independently of a state of the selected tablet computer.

24. The modular case assembly according to claim 23, wherein the exterior housing has a connector configured to connect to a portion of the tablet carrier encased the selected tablet computer.

25. The modular case assembly according to claim 23, wherein the exterior housing has an interface configured to connect to a portion of the tablet carrier encased the selected tablet computer for establishing communication between the controller and tablet computer.

* * * * *